United States Patent
Liang et al.

(10) Patent No.: US 11,962,045 B1
(45) Date of Patent: Apr. 16, 2024

(54) ENERGY STORAGE DEVICE AND POWER CONSUMING APPARATUS

(71) Applicants: Shenzhen Hithium Energy Storage Technology Co., Ltd., Guangdong (CN); Xiamen Hithium Energy Storage Technology Co., Ltd., Fujian (CN)

(72) Inventors: Jinyun Liang, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/231,030

(22) Filed: Aug. 7, 2023

(30) Foreign Application Priority Data

Feb. 9, 2023 (CN) .......................... 202310091078.8

(51) Int. Cl.
*H01M 50/583* (2021.01)
*H01M 50/103* (2021.01)
(Continued)

(52) U.S. Cl.
CPC ....... *H01M 50/583* (2021.01); *H01M 50/103* (2021.01); *H01M 50/15* (2021.01);
(Continued)

(58) Field of Classification Search
CPC .............. H01M 50/583; H01M 50/586; H01M 50/533; H01M 50/59; H01M 50/103; H01M 50/55; H01M 50/15; H01M 2200/103

See application file for complete search history.

(56) References Cited

U.S. PATENT DOCUMENTS

2018/0040918 A1* 2/2018 Guen ................. H01M 50/176
2022/0263201 A1 8/2022 Wang et al.

FOREIGN PATENT DOCUMENTS

CN 101802953 A 8/2010
CN 205429058 U 8/2016
(Continued)

OTHER PUBLICATIONS

WO2022160494 translation (Year: 2022).*
(Continued)

*Primary Examiner* — Jane J Rhee
(74) *Attorney, Agent, or Firm* — IP Spring

(57) ABSTRACT

An energy storage device includes a current collecting member. The current collecting member includes an adapter and an insulator, the adapter includes a first connecting portion, a fuse portion, and a second connecting portion, and the ratio of the width of the fuse portion to the width of the first connecting portion is in a range from $1/6$ to $4/5$. The first connecting portion is provided with first corners, and the second connecting portion is provided with second corners. The insulator is provided with a first protective portion, a second protective portion and a third protective portion. The first protective portion covers the first corners, the second protective portion covers the second corners, the third protective portion covers a first surface of the fuse portion of the adapter, and a second surface of the fuse portion is at least partially exposed from the insulator.

20 Claims, 15 Drawing Sheets

(51) Int. Cl.
  *H01M 50/15* (2021.01)
  *H01M 50/533* (2021.01)
  *H01M 50/55* (2021.01)
  *H01M 50/586* (2021.01)
  *H01M 50/59* (2021.01)

(52) U.S. Cl.
  CPC ......... *H01M 50/533* (2021.01); *H01M 50/55* (2021.01); *H01M 50/586* (2021.01); *H01M 50/59* (2021.01); *H01M 2200/103* (2013.01)

(56) References Cited

FOREIGN PATENT DOCUMENTS

| CN | 209329018 U | 8/2019 |
|----|-------------|--------|
| CN | 209344143 U | 9/2019 |
| CN | 112787047 A | 5/2021 |
| CN | 213717030 U | 7/2021 |
| CN | 214280158 U | 9/2021 |
| CN | 217158580 U | 8/2022 |
| CN | 217903377 U | 11/2022 |
| CN | 218300161 U | 1/2023 |
| JP | 2007250301 A | 9/2007 |
| JP | 2015095404 A | 5/2015 |

OTHER PUBLICATIONS

CNIPA, First Office Action for Chinese Patent Application No. 202310091078.8, dated Apr. 12, 2023, 22 pages.

CNIPA, Notice of Allowance for Chinese Patent Application No. 202310091078.8, dated Apr. 26, 2023, 12 pages.

WIPO, International Search Report and Written Opinion for International Application No. PCT/CN2023/075249, dated Oct. 26, 2023, 14 pages.

* cited by examiner

ENERGY STORAGE DEVICE AND POWER CONSUMING APPARATUS

CROSS-REFERENCE TO RELATED APPLICATION(S)

This application claims priority under 35 U.S.C. § 119(a) to and the benefit of Chinese Patent Application No. 202310091078.8, filed Feb. 9, 2023, the entire disclosure of which is incorporated herein by reference.

TECHNICAL FIELD

The present disclosure relates to the technical field of energy storage, and in particular, to an energy storage device and a power consuming apparatus.

BACKGROUND

In related technologies, an adapter is configured to connect a post to an electrode assembly for current transmission. In addition, a fuse portion with a narrowed dimension is usually formed in an intermediate region of the adapter, and the formation of the fuse portion easily leads to cuts of the electrode assembly.

SUMMARY

An energy storage device is provided in a first aspect of the present disclosure. The energy storage device includes: a housing having an opening, the housing defining an accommodating cavity; an electrode assembly accommodated inside the accommodating cavity; an end cap assembly covering the opening; a pole assembly arranged in the end cap assembly, the pole assembly including a flange; a lower plastic part arranged between the electrode assembly and the end cap assembly; and a current collecting member. The current collecting member is arranged on a side of the lower plastic part away from the end cap assembly. The current collecting member includes an adapter and an insulator. The adapter includes a first surface and a second surface that are arranged in a thickness direction of the adapter itself, the first surface is located on a side of the adapter that faces an electrode assembly of the energy storage device, and the second surface is located on a side of the adapter that faces away from the electrode assembly of the energy storage device. The adapter includes a first connecting portion, a fuse portion and a second connecting portion in a length direction of the adapter, the first connecting portion of the current collecting member is electrically connected to the pole assembly, the second connecting portion of the current collecting member is electrically connected to the electrode assembly, and the fuse portion is connected between the first connecting portion and the second connecting portion. A ratio of a width of the fuse portion in a width direction of the adapter to a width of the first connecting portion and a ratio of the width of the fuse portion in the width direction of the adapter to a width of the second connecting portion each are in a range from 1/6 to 4/5. The first connecting portion is provided with first corners at an end of the first connecting portion close to the second connecting portion, and the second connecting portion is provided with second corners at an end of the second connecting portion close to the first connecting portion. The insulator is provided with a first protective portion, a second protective portion and a third protective portion in the length direction of the adapter. The first protective portion covers the first corners, the second protective portion covers the second corners, the third protective portion is connected between the first protective portion and the second protective portion, the third protective portion covers a first surface of the fuse portion of the adapter, and a second surface of the fuse portion is at least partially exposed from the insulator. In the thickness direction of the adapter, a stepped recess is defined in a surface of the insulator close to the second surface of the adapter, the stepped recess includes a first recess and a second recess that are arranged opposite to each other in the width direction of the adapter, the fuse portion is arranged between the first recess and the second recess, a side of the first recess close to the flange and a side of the second recess close to the flange define a connecting line L, and an end of the flange adjacent to the fuse portion extends beyond the connecting line L towards the insulator.

A power consuming apparatus is provided in a second aspect of the present disclosure. The power consuming apparatus includes an energy storage device provided in the first aspect of the present disclosure, and the energy storage device supplies power to the power consuming apparatus.

BRIEF DESCRIPTION OF THE DRAWINGS

To explain technical solutions in implementations of the present disclosure more clearly, the accompanying drawings required for the implementations of the present disclosure will be described below.

LIST OF REFERENCE SIGNS

Figure 1:
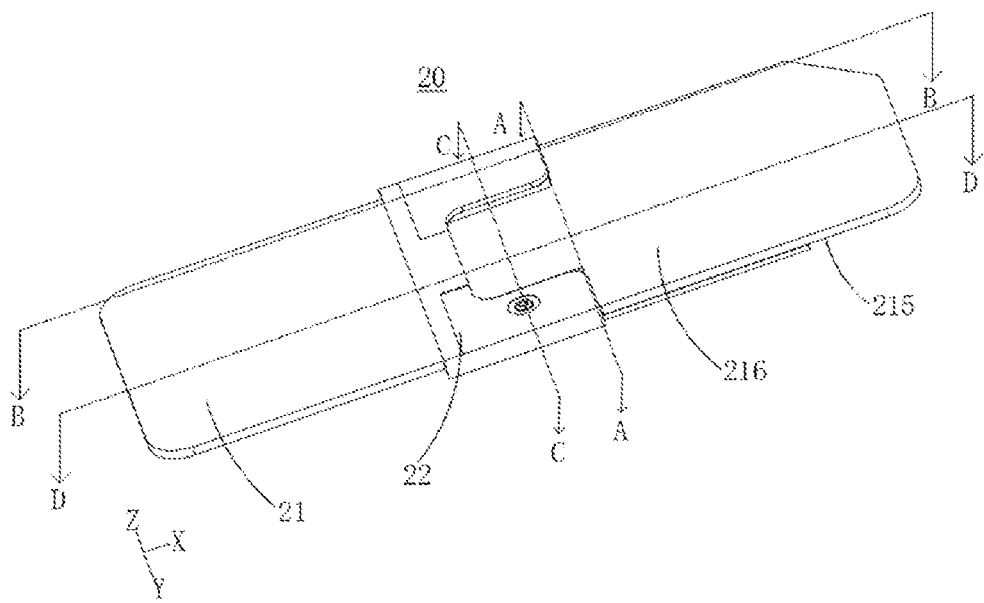
FIG. 1 is a schematic perspective structural diagram of a current collecting member according to an implementation of the present disclosure.
Figure 2:
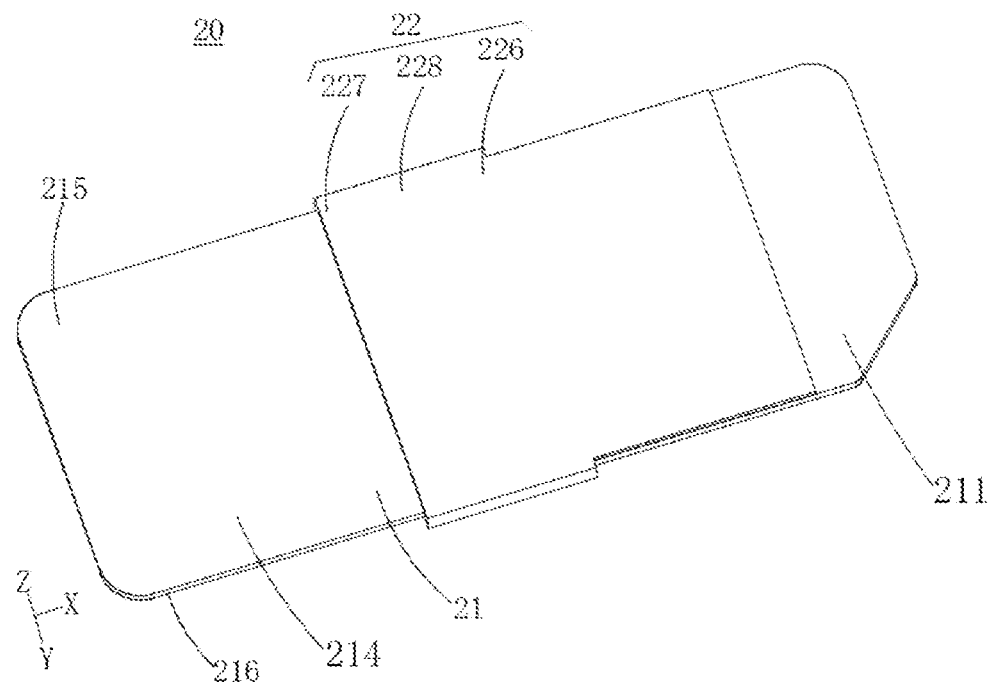
FIG. 2 is a schematic perspective structural diagram of the current collecting member shown in FIG. 1 from another perspective.

Power consuming apparatus—100, energy storage device—1, end cap assembly—10, lower plastic part—11, through hole—110, grid structure—111, avoidance recess—112, second mounting hole—113, upper rubber part—12, top cap—13, first mounting hole—130, stress member—14, pole assembly—15, flange—151, riveting portion—152, current collecting member—20, length direction—X, width direction—Y, thickness direction—Z, adapter—21, first connecting portion—211, transition—212, first corners—2120, first recess—2121, fuse portion—213, avoidance space—2130, second connecting portion—214, second corners—2140, first surface—215, second surface—216, insulator—22, stepped recess—220, injection-molded necking portion—2200, first recess—2201, second recess—2202, extension—221, second recess—2210, first covering portion—223, projection—2230, second covering portion—224, first protective portion—226, second protective portion—227, third protective portion—228, electrode assembly—30, housing—50, opening—501, accommodating cavity—502.

DETAILED DESCRIPTION

Implementations of the present disclosure are provided below, and it should be noted that for those of ordinary skill in the art, several improvements and modifications may also be made without departing from the principle of the present disclosure, and these improvements and modifications are also considered to be within the scope of protection of the present disclosure.

Referring to FIGS. 1 to 7 and FIGS. 14 to 18 together, this implementation provides a current collecting member 20 applied to an energy storage device 1. The current collecting member 20 includes an adapter 21 and an insulator 22. The adapter 21 includes a first surface 215 and a second surface 216 that are arranged in a thickness direction Z of the adapter itself, the first surface 215 is located on a side of the adapter 21 that faces an electrode assembly 30 of the energy storage device 1, and the second surface 216 is located on a side of the adapter 21 that faces away from the electrode assembly 30 of the energy storage device 1. The adapter 21 includes a first connecting portion 211, a fuse portion 213 and a second connecting portion 214 in a length direction X of the adapter 21, and the fuse portion 213 is connected between the first connecting portion 211 and the second connecting portion 214. A ratio of a width of the fuse portion in a width direction of the adapter to a width of the first connecting portion and a ratio of the width of the fuse portion in the width direction of the adapter to a width of the second connecting portion each are in a range from ⅙ to ⅘. An end of the first connecting portion 211 close to the second connecting portion 214 is provided with first corners 2120, and an end of the second connecting portion 214 close to the first connecting portion 211 is provided with second corners 2140. The insulator 22 is provided with a first protective portion 226, a second protective portion 227 and a third protective portion 228 in the length direction X of the adapter 21. The first protective portion 226 covers the first corners 2120, the second protective portion 227 covers the second corners 2140, the third protective portion 228 is connected between the first protective portion 226 and the second protective portion 227, the third protective portion 228 covers a first surface 215 of the fuse portion 213 of the adapter 21, and a second surface 216 of the fuse portion 213 is at least partially exposed from the insulator 22.

The current collecting member 20 provided in this implementation is mainly applied to the energy storage device 1, and a pole assembly 15 and the electrode assembly 30 can be indirectly connected together by the current collecting member 20, so as to facilitate transmission of electrical signals such as currents. The current collecting member 20 mainly includes the adapter 21 and the insulator 22, which will be described in detail below. The current collecting member 20 may be a positive current collecting member and a negative current collecting member. When the current collecting member 20 is a positive current collecting member, the adapter 21 is a positive adapter. When the current collecting member 20 is a negative current collecting member, the adapter 21 is a negative adapter. This implementation is schematically described only with the current collecting member 20 as a positive current collecting member.

The adapter 21 mainly servers to provide an electrical connection, that is, to enable indirect connection of the pole assembly 15 with the electrode assembly 30 as mentioned above. Specifically, the adapter 21 includes a first surface 215 and a second surface 216 that are arranged in a thickness direction Z of the adapter itself, the first surface 215 is a side surface of the adapter 21 close to the electrode assembly 30, and the second surface 216 is a side surface of the adapter 21 that faces away from the electrode assembly 30. In other words, in a thickness direction Z of the energy storage device 1, the first surface 215 is a lower surface of the adapter 21, and the second surface 216 is an upper surface of the adapter 21. The adapter 21 may include a first connecting portion 211, a fuse portion 213, and a second connecting portion 214, or in other implementations, the adapter 21 may also include a first connecting portion 211, a transition 212, a fuse portion 213, and a second connecting portion 214. The first connecting portion 211, the transition 212, the fuse portion 213 and the second connecting portion 214 are sequentially connected, that is, the first connecting portion 211 is connected to the transition 212, the fuse portion 213 is connected to a side of the transition 212 away from the first connecting portion 211, and the second connecting portion 214 is connected to a side of the fuse portion 213 away from the transition 212. The first connecting portion 211 is configured to be connected to the pole assembly 15, and the second connecting portion 214 is configured to be connected to the electrode assembly 30. The transition 212 may serve to connect the first connecting portion 211 and the fuse portion 213, and other structures may be further arranged on the transition 212 subsequently to achieve other functions. The specific structure of the transition 212 will be described in detail below in the present disclosure.

Figure 4:
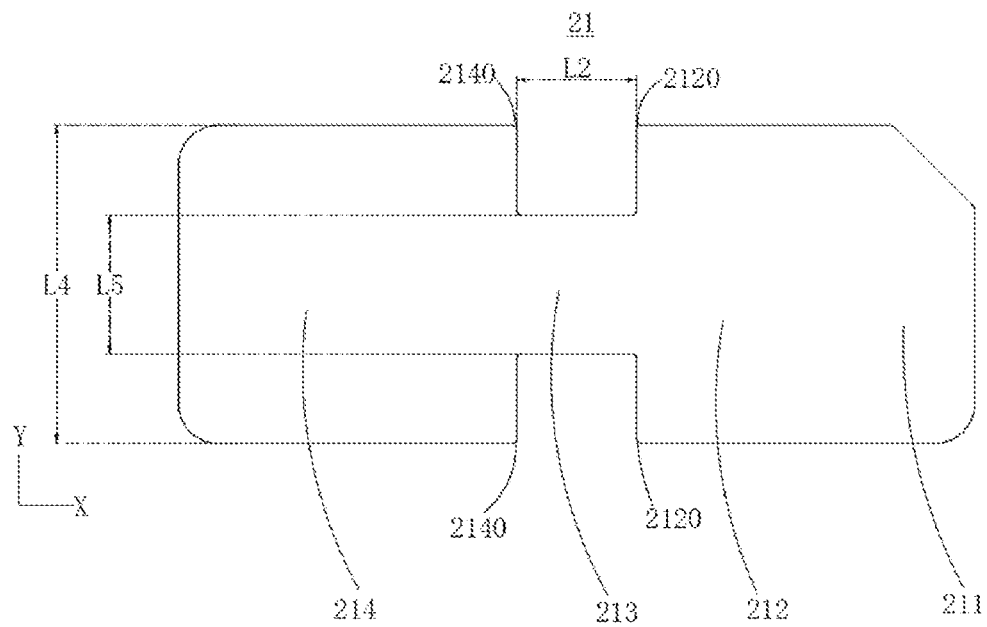
FIG. 4 is a top view of an adapter shown in FIG. 1.

The fuse portion 213 mainly provides a function of fusion. As shown in FIG. 4, in this implementation, in the width direction Y of the adapter 21, the fuse portion 213 has a width (as shown by L5 in FIG. 4) less than the width (as shown by L4 in FIG. 4) of the first connecting portion 211 and the width (as shown by L4 in FIG. 4) of the second connecting portion 214. In other words, the adapter 21 is not of a flat and straight structure, and the fuse portion 213 is narrower the second connecting portion 214 and the first connecting portion 211 on each side thereof. Specifically, the ratio of the width L5 of the fuse portion 213 to the width L4 of the first connecting portion 211 and the width L5 of the second connecting portion 214 is in a range from 1/6 to 4/5. Alternatively, the ratio of the width L5 of the fuse portion 213 to the width L4 of the first connecting portion 211 and the width L5 of the second connecting portion 214 may be 1/6, 0.2, 0.25, 0.3, 0.35, 0.4, 0.45, 0.5, 0.55, 0.6, 0.65, 0.7, 0.75, 0.8, etc.

In this way, the fuse portion 213 may have a reduced cross-sectional area and an increased resistance. When the energy storage device 1 is overloaded or overcharged, a relatively large current is generated and passes through the adapter 21, so the fuse portion 213 with a relatively large resistance generates more heat. For the fuse portion 213, when the current passing through the current collecting member 20 reaches a fusing current, the fuse portion 213 is overheated and fused, such that the pole assembly 15 is electrically disconnected from the electrode assembly 30, thereby effectively protecting the energy storage device 1 so as to reduce accidents such as explosion and fire of the energy storage device 1.

Optionally, the first connecting portion 211, the transition 212, the fuse portion 213 and the second connecting portion 214 may be of an integrated structure or a split structure, and this implementation is schematically described with the first connecting portion 211, the transition 212, the fuse portion 213 and the second connecting portion 214 as an integrated structure.

Optionally, the material of the adapter 21 includes, but is not limited to, metal, such as copper, aluminum, nickel, and an alloy thereof.

It should be noted that the adapter 21 is a component of a three-dimensional structure with a certain dimension, and the adapter 21 has a length direction X, a width direction Y, and a thickness direction Z. The length direction X may be understood as an X direction in the figures, and the length direction X may also be understood as a direction in which the first connecting portion 211, the transition 212, the fuse portion 213 and the second connecting portion 214 are arranged. The width direction Y may be understood as a Y direction in the figures, and the width direction Y may also be understood as a direction in which the first connecting portion 211, the transition 212, the fuse portion 213 and the second connecting portion 214 are arranged. The thickness direction Z may be understood as a Z direction in the figures, and the thickness direction Z may also be understood as a direction perpendicular to both the length direction X and the width direction Y. Furthermore, other components such as the energy storage device 1, the insulator 22, and the lower plastic part 11 also each have a length direction X, a width direction Y, and a thickness direction Z. The length direction X, the width direction Y and the thickness direction Z of the other components may be understood similarly as the length direction X, the width direction Y and the thickness direction Z of the adapter 21, and details will not be repeated herein in this implementation.

It can be seen from the above that in this implementation, the fuse portion 213 with a reduced dimension is more prone to fusing. However, the narrowed fuse portion 213 may result in a gap between the second connecting portion 214 and the transition 212. When the current collecting member 20 is applied to the energy storage device 1 and the energy storage device 1 is overcharged or overloaded, a large current may pass through the adapter 21, and in this case, an arc may be generated between the transition 212 and the second connecting portion 214, thus affecting the service performance and service life of the energy storage device 1. Therefore, in this implementation, the insulator 22 may be at least partially located between the transition 212 and the second connecting portion 214 by additionally providing the insulator 22 and covering the fuse portion 213 with the insulator 22. In this way, the insulation performance of the insulator 22 may be used to prevent the occurrence of an arc when the current is too large, thereby achieving the effect of arc extinguishing, ensuring normal use of other components, and improving the service performance and service lives of the other components.

Optionally, the insulator 22 may be a rubber insulator. Further, alternatively, the insulator 22 may be a transparent rubber insulator.

In this implementation, the insulator 22 is an injection molded part that is integrally injection-molded on a surface of fuse portion 213. It may also be understood that the insulator 22 may be obtained by injection molding on the basis of the adapter 21, and the insulator 22 obtained by injection molding directly covers the fuse portion 213, thereby achieving an integrated structure and improving the connection performance of the current collecting member 20. Furthermore, by means of an integral injection molding process, it is also possible to prevent the insulator 22 from being directly sleeved from an end of the first connecting portion 211 or second connecting portion 214, which may break the fuse portion 213 with a relatively small width during sleeving, such that the structural stability of the current collecting member 20 is improved.

Optionally, the adapter 21 and the insulator 22 may be prepared by in-mold injection molding. Specifically, the adapter 21 is prepared before the adapter 21 is placed into a mold, and the insulator 22 is then prepared by injection molding. The insulator 22 obtained after demolding may directly wrap around and cover the fuse portion 213.

Of course, in other implementations, the adapter 21 and the insulator 22 may also be prepared by bonding, sleeving or hot melting, and these methods should also fall within the scope of protection of the present disclosure.

Furthermore, in this implementation, in the width direction Y of the adapter 21, the insulator 22 is dimensioned to be greater than the width of the first connecting portion 211 and the width of the second connecting portion 214.

The electrode assembly 30 is a component for connection with the adapter 21, so the electrode assembly 30 has a certain dimension and shape. The electrode assembly 30 is usually composed of multiple plates, and each plate is thin and soft. The electrode assembly 30 may even be bent, such that part of the electrode assembly 30 is arranged directly corresponding to the fuse portion 213. It may also be understood that the electrode assembly 30 may be located on a side of the adapter 21 in the thickness direction Z of the adapter 21, or may be located on a side of the adapter 21 in the width direction Y of the adapter 21. Furthermore, it can be seen from the foregoings that the fuse portion 213 is narrowed, such that the periphery of the fuse portion 213 has sharp corners. Specifically, the end of the first connecting portion 211 close to the second connecting portion 214 is provided with first corners 2120, and the end of the second connecting portion 214 close to the first connecting portion 211 is provided with second corners 2140. Of course, it may also be understood that an end of the transition 212 close to the fuse portion 213 has two first corners 2120 arranged opposite to each other in the width direction Y of the adapter 21, and an end of the second connecting portion 214 close to the fuse portion 213 has two second corners 2140 arranged opposite to each other in the width direction Y of the adapter 21. During assembly of the electrode assembly 30 and the adapter 21, and during use and transportation of the current collecting member 20, the presence of the first corners 2120 and the second corners 2140 easily cuts, punctures and damages the electrode assembly 30 when the electrode assembly 30 is brought into contact with the adapter 21.

Therefore, in this implementation, in the width direction Y of the adapter 21, the insulator 22 is dimensioned (as shown by L3 in FIGS. 5 and 6) to be greater than the width (as shown by L4 in FIGS. 5 and 6) of the first connecting portion 211 and the width of the second connecting portion 214. That is, the dimension of the insulator 22 is greater than the width of the adapter 21. In other words, the insulator 22 may protrude from the first corners 2120 and the second corners 2140 in the width direction Y. It may also be understood that the insulator 22 can cover a side of each of the first corners 2120 and a side of each of the second corners 2140. In this way, when the electrode assembly 30 comes into contact with the adapter 21 in the width direction Y of the adapter, the electrode assembly 30 first comes into contact with the part of the insulator 22 protruding from the adapter 21, and would not come into contact with the first corners 2120 and the second corners 2140. In other words, even when the electrode assembly 30 is bent, the electrode assembly 30 will not come into contact with the first corners 2120 and the second corners 2140, but comes into contact with the part of the insulator 22 protruding from the adapter 21. Therefore, the electrode assembly 30 is effectively protected, and the electrode assembly 30 is prevented from being cut, punctured and damaged by the first corners 2120 and the second corners 2140.

On the basis that the insulator 22 protrudes from the adapter 21, in this implementation, in the length direction X of the adapter 21, the insulator 22 may also be dimensioned (as shown by L1 in FIG. 5) to be greater than the length (as shown by L2 in FIG. 4) of the fuse portion 213, that is, the length of the insulator 22 is greater than a distance between the transition 212 and the second connecting portion 214. In other words, the insulator 22 may cover the first corners 2120 and the second corners 2140 in the length direction X. It may also be understood that in the length direction X, the first corners 2120 and the second corners 2140 may be located on a side of the insulator 22, or the first corners 2120 and the second corners 2140 are located in the insulator 22. Alternatively, a side surface of the insulator 22 that covers the first corners 2120 and the second corners 2140 and a surface of the electrode assembly 30 that is connected to the second connecting portion 214 are the same side surface. In this way, the electrode assembly 30 may not directly contact with the first corners 2120 and the second corners 2140, and may contact with the insulator 22 first. It may also be understood that the insulator 22 is arranged between the electrode assembly 30 and the first corners 2120 and the second corners 2140. The arrangement of the insulator 22 as an intermediate protective layer further prevents the first corners 2120 and the second corners 2140 from cutting the electrode assembly 30, thereby prolonging the service life of the electrode assembly 30.

Specifically, since the insulator 22 covers the fuse portion 213, the first surface 215 and the second surface 216 of the fuse portion 213 each are provided with the insulator 22 in the thickness direction Z of the adapter 21. Therefore, in an implementation, the length of the insulator 22 located on a side of the fuse portion 213 is greater than that of the fuse portion 213, that is, the insulator 22 may cover a side surface of each of the first corners 2120 and a side surface of each of the second corners 2140. In another implementation, the length of the insulator 22 located on opposite sides of the fuse portion 213 is greater than that of the fuse portion 213, that is, the insulators 22 may cover surfaces of the opposite sides of the first corners 2120 and the second corners 2140. In other words, the insulators 22 may be sandwiched to create an accommodating space in which the first corners 2120 and the second corners 2140 are accommodated. This implementation is schematically described only with the length of the insulator 22 located on the opposite sides of the fuse portion 213 is greater than the distance between the transition 212 and the second connecting portion 214.

For the structure of the insulator 22 provided in this implementation, it may also be understood that the insulator 22 is provided with a first protective portion 226, a second protective portion 227 and a third protective portion 228 in the length direction X of the adapter 21, with the first protective portion 226 covering the first corners 2120, and the second protective portion 227 covering the second corners 2140. In other words, in this implementation, the peripheries of the first corners 2120 may be covered by the first protective portion 226 of the insulator 22, such that the first corners 2120 are arranged in the first protective portion 226. Furthermore, the peripheries of the second corners 2140 is covered by the second protective portion 227 of the insulator 22, such that the second corners 2140 are arranged in the second protective portion 227. In this way, after the electrode assembly 30 is assembled with the adapter 21, the electrode assembly 30 may be brought into contact with the first protective portion 226 on the peripheries of the first corners 2120 and the second protective portion 227 on the peripheries of the second corners 2140, thereby preventing the electrode assembly 30 from contact with the first corners 2120 and the second corners 2140 around the fuse portion 213, preventing the electrode assembly 30 from being cut by the first corners 2120 and the second corners 2140, and effectively protecting the electrode assembly 30.

Furthermore in addition to the first protective portion 226 and the second protective portion 227, the insulator 22 may include a third protective portion 228. The third protective portion 228 is connected between the first protective portion 226 and the second protective portion 227, the third protective portion 228 covers the first surface 215 of the fuse portion 213 of the adapter 21, and the second surface 216 of the fuse portion 213 is at least partially exposed, so as to provide a basis for a subsequent avoidance space. In an implementation, the entire second surface 216 of the fuse portion 213 may be exposed. In another implementation, the second surface 216 of the fuse portion 213 may be partially exposed, and the rest of the second surface is still covered by the insulator 22. This implementation is schematically described only with part of the second surface 216 of the fuse portion 213 being partially exposed.

In this implementation, the third protective portion 228 may further cover the fuse portion 213 of the adapter 21 to provide a buffer for the fuse portion 213, which effectively protects the fuse portion 213, prevents the fuse portion 213 from fracturing due to vibrations of the current collecting member 20, and increases the structural strength of the current collecting member 20. In addition, the third protective portion 228 may also cover sharp edges on each side of the fuse portion 213, thereby preventing the edges of the fuse portion 213 from cutting the electrode assembly 30.

In this implementation, the first corners 2120 and the second corners 2140 may be rounded to prevent the first corners 2120 and the second corners 2140 from puncturing the first protective portion 226 and the second protective portion 227. Furthermore, in this implementation, each of the first corners 2120 may have an arc radius of 2.1-3.6 mm, and each of the second corners 2140 may have an arc radius of 2.1-3.6 mm.

Alternatively, the arc radius of each of the first corners 2120 may be 2.1 mm, 2.3 mm, 2.5 mm, 2.7 mm, 2.9 mm, 3.0 mm, 3.2 mm, 3.4 mm, 3.6 mm, etc.

Alternatively, the arc radius of each of the second corners 2140 may be 2.1 mm, 2.3 mm, 2.5 mm, 2.7 mm, 2.9 mm, 3.0 mm, 3.2 mm, 3.4 mm, 3.6 mm, etc.

Referring to FIGS. 4 and 5 again, in the implementation, in the length direction X of the adapter 21, the insulator 22 has a dimension L1, and a distance L2 is provided between the first connecting portion 211 and the second connecting portion 214, where 0.01 mm≤L1−L2≤3.1 mm.

In this implementation, the difference between the dimension of the insulator 22 and the distance between the first connecting portion 211 and the second connecting portion 214 may be between 0.01-3.1 mm in the length direction X of the adapter 21, so as to prevent a case in which the insulator 22 is such short in the length direction X that the first protective portion 226 of the insulator 22 cannot cover the first corners 2120 and the second protective portion 227 of the insulator 22 cannot cover the second corners 2140. It is also possible to prevent the insulator 22 from being such long in the length direction X that the insulator 22 covers and occupies an excessive region between the transition 212 and the second connecting portion 214 and thus that a welding region between the second connecting portion 214 and the electrode assembly 30 is small, and thus that a region of the transition 212 where a groove is provided is small, which affects an anti-laser reflection function of the transition 212.

Alternatively, the difference between the dimension of the insulator 22 and the distance between the first connecting portion 211 and the second connecting portion 214 may be 0.01 mm, 0.05 mm, 0.1 mm, 0.2 mm, 0.4 mm, 0.6 mm, 0.8 mm, 1.0 mm, 1.5 mm, 2.0 mm, 2.1 mm, 2.2 mm, 2.4 mm, 2.6 mm, 2.8 mm, 2.9 mm, 3.0 mm, 3.1 mm, etc.

Figure 5:
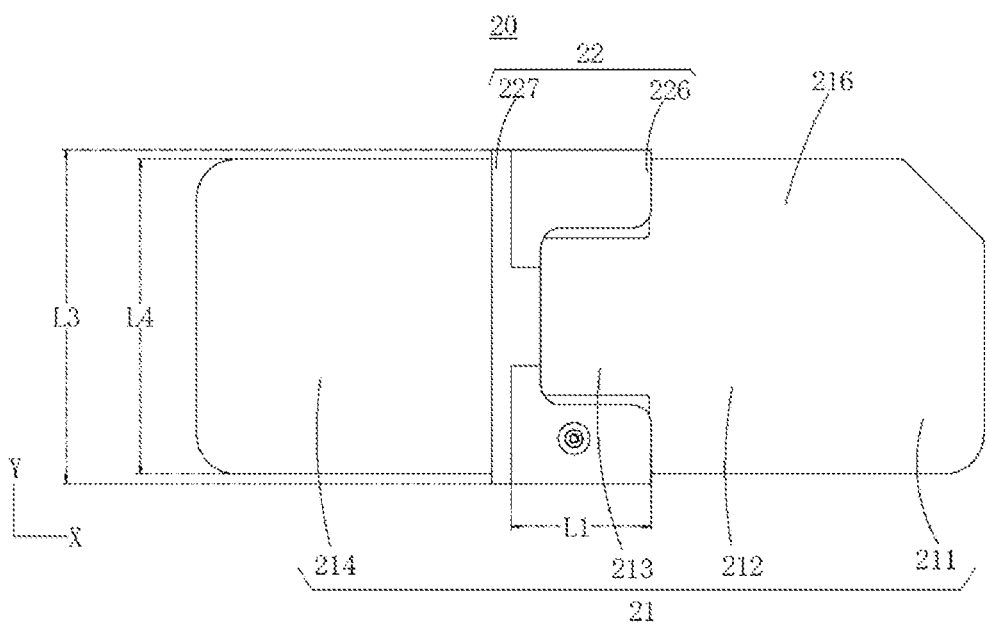
FIG. 5 is a top view of the current collecting member shown in FIG. 1.
Figure 6:
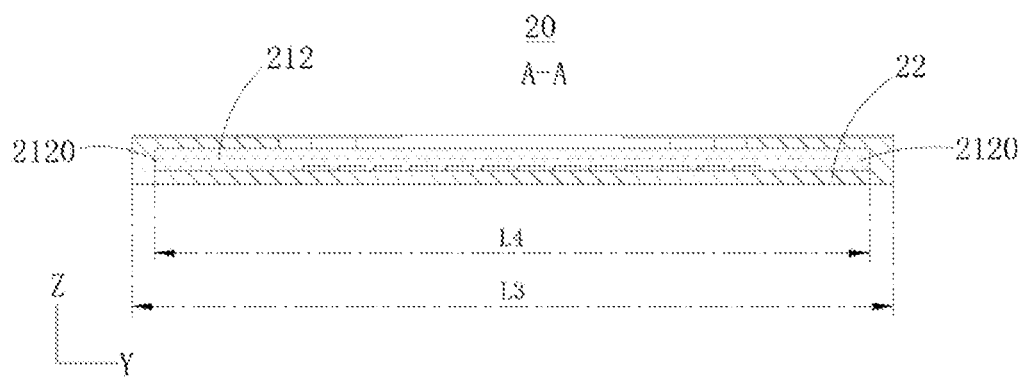
FIG. 6 is a schematic sectional view of the current collecting member shown in FIG. 1 along line A-A.
Figure 7:
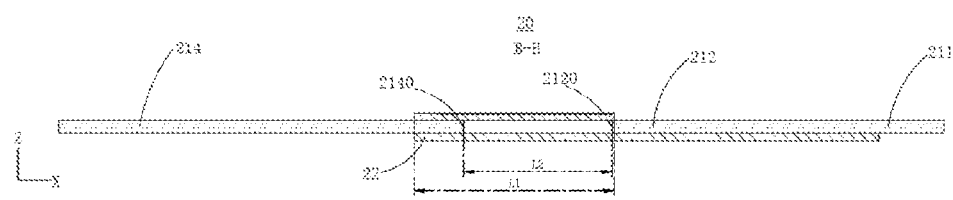
FIG. 7 is a schematic sectional view of the current collecting member shown in FIG. 1 along line B-B.
Figure 8:
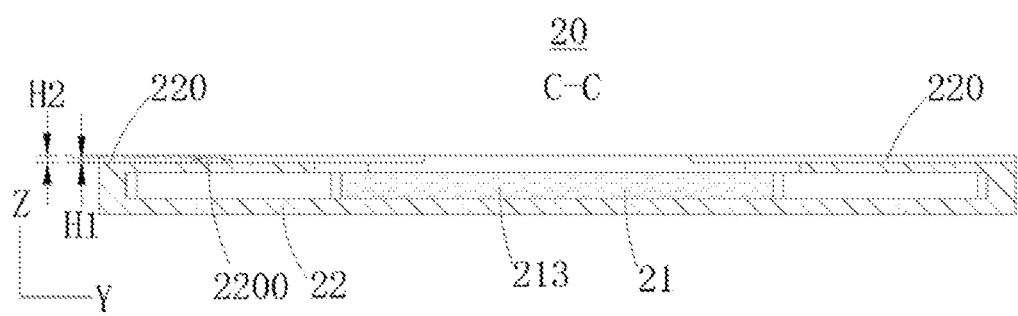
FIG. 8 is a schematic sectional view of the current collecting member shown in FIG. 1 along line C-C.

Referring to FIGS. 5 and 6, in this implementation, in the width direction Y of the adapter 21, the insulator 22 has a dimension L3, and the adapter 21 has a width L4, where 0.01 mm≤L3−L4≤2.4 mm.

In this implementation, the difference between the dimension of the insulator 22 and the width of the adapter 21 is between 0.01-2.4 mm in the width direction Y of the adapter 21, so as to prevent a case in which the insulator 22 is such narrow in the width direction Y that the first protective portion 226 of the insulator 22 cannot cover the first corners 2120 and the second protective portion 227 of the insulator cannot cover the second corners 2140. It is also possible to prevent a case in which the insulator 22 in the width direction Y is too wide, which increases the overall width of the current collecting member 20, and increases the difficulty of subsequent assembly of the current collecting member 20 with components such as the lower plastic part 11.

Alternatively, the difference between the dimension of the insulator 22 and the width of the adapter 21 may be 0.01 mm, 0.05 mm, 0.1 mm, 0.2 mm, 0.4 mm, 0.6 mm, 0.8 mm, 1.0 mm, 1.2 mm, 1.4 mm, 1.6 mm, 1.8 mm, 2.0 mm, 2.2 mm, 2.4 mm, etc.

Referring to FIGS. 1 to 3, 8 and 18, in this implementation, in the thickness direction Z of the adapter 21, a surface of the insulator 22 close to the second surface 216 of the adapter 21 has a stepped recess 220, a bottom wall of the stepped recess 220 is provided with an injection-molded necking portion 2200, and the height (as shown by H1 in FIG. 8) of the injection-molded necking portion 2200 is less than or equal to the depth (as shown by H2 in FIG. 8) of the stepped recess 220.

In this implementation, a stepped recess 220 may be further provided in a surface of the insulator 22 close to the second surface 216 of the adapter 21 in the thickness direction Z of the adapter 21. It can be seen from the foregoings that the adapter 21 and the insulator 22 are prepared by an integral injection molding process, such that an injection-molded necking portion 2200 for injection molding is formed on the insulator 22. Therefore, in this implementation, the injection-molded necking portion 2200 may be arranged on the bottom wall of the stepped recess 220, and the height of the injection-molded necking portion 2200 is less than or equal to the depth of the stepped recess 220, such that the overall thickness of the current collecting member 20 is reduced, which can ensure that the surface of the insulator 22 is flush, and the current collecting member 20 can be flush with and attached to a lower surface of the lower plastic part 11 when subsequently mounted on the lower plastic part 11.

In this implementation, the ratio of the height H1 of the injection-molded necking portion 2200 to the depth H2 of the stepped recess 220 is greater than or equal to 1/10 and less than or equal to 9/10. In other words, in this implementation, a distance may be provided between a surface of the injection-molded necking portion 2200 that faces away from the bottom wall of the stepped recess 220 and a surface of the insulator 22 that is provided with the stepped recess 220. It may also be understood that a top surface of the injection-molded necking portion 2200 is lower than an edge surface of the insulator 22 that is provided with the stepped recess 220, that is, the injection-molded necking portion 2200 is completely arranged inside the stepped recess 220 to prevent the injection-molded necking portion 2200 from protruding from the surface of the insulator 22 that is provided with the stepped recess 220, which can further reduce the overall thickness of the current collecting member 20. Moreover, when the current collecting member 20 is subsequently mounted on the lower plastic part 11, only the surface of the insulator 22 provided with the stepped recess 220 fits with the lower plastic part 11, thereby avoiding the influences of the injection-molded necking portion 2200 on assembly, such that the current collecting member 20 may be further flush with and attached to the lower surface of the lower plastic part 11.

Alternatively, the ratio of the height H1 of the injection-molded necking portion 2200 to the depth H2 of the stepped recess 220 may be 0.1, 0.2, 0.3, 0.4, 0.5, 0.6, 0.7, 0.8, 0.9, etc.

In this implementation, the height H1 of the injection-molded necking portion 2200 ranges from 0.06 mm to 0.31 mm. Alternatively, the height H1 of the injection-molded necking portion 2200 may be 0.06 mm, 0.08 mm, 0.1 mm, 0.12 mm, 0.15 mm, 0.18 mm, 0.2 mm, 0.25 mm, 0.26 mm, 0.27 mm, 0.28 mm, 0.29 mm, 0.3 mm, 0.31 mm, etc.

Figure 9:
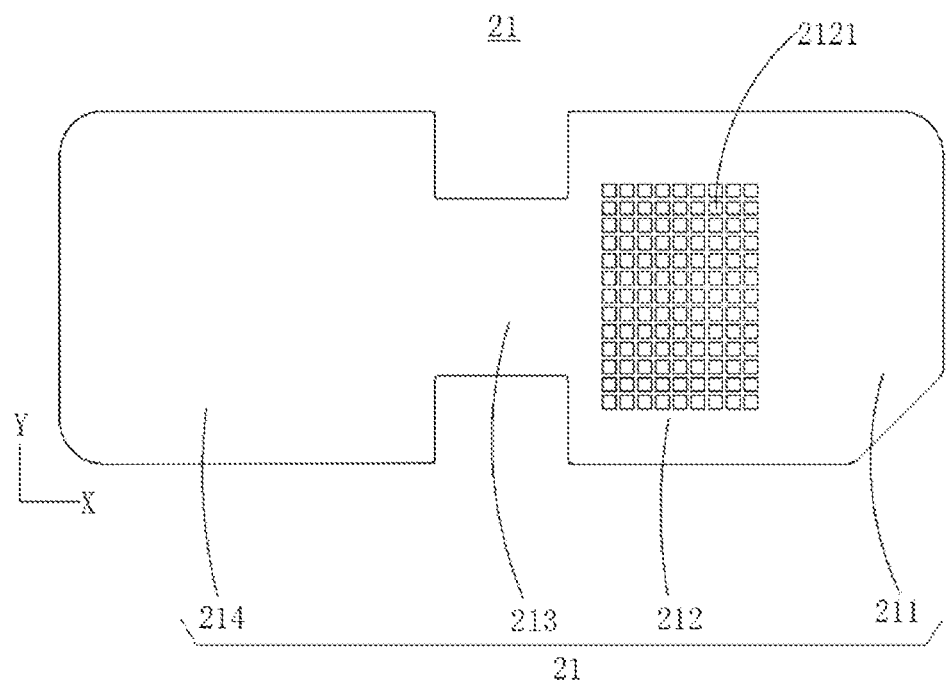
FIG. 9 is a bottom view of the adapter shown in FIG. 4.
Figure 10:
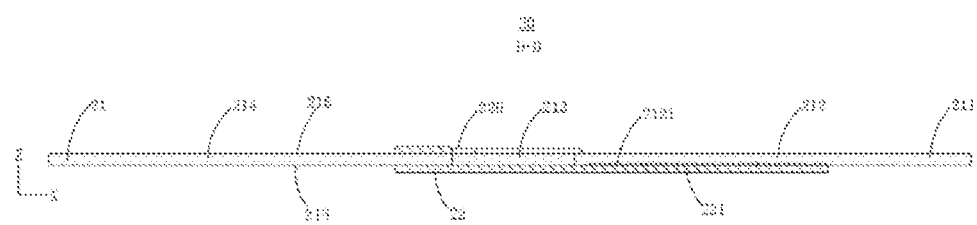
FIG. 10 is a schematic sectional view of the current collecting member shown in FIG. 1 along line D-D.
Figure 18:
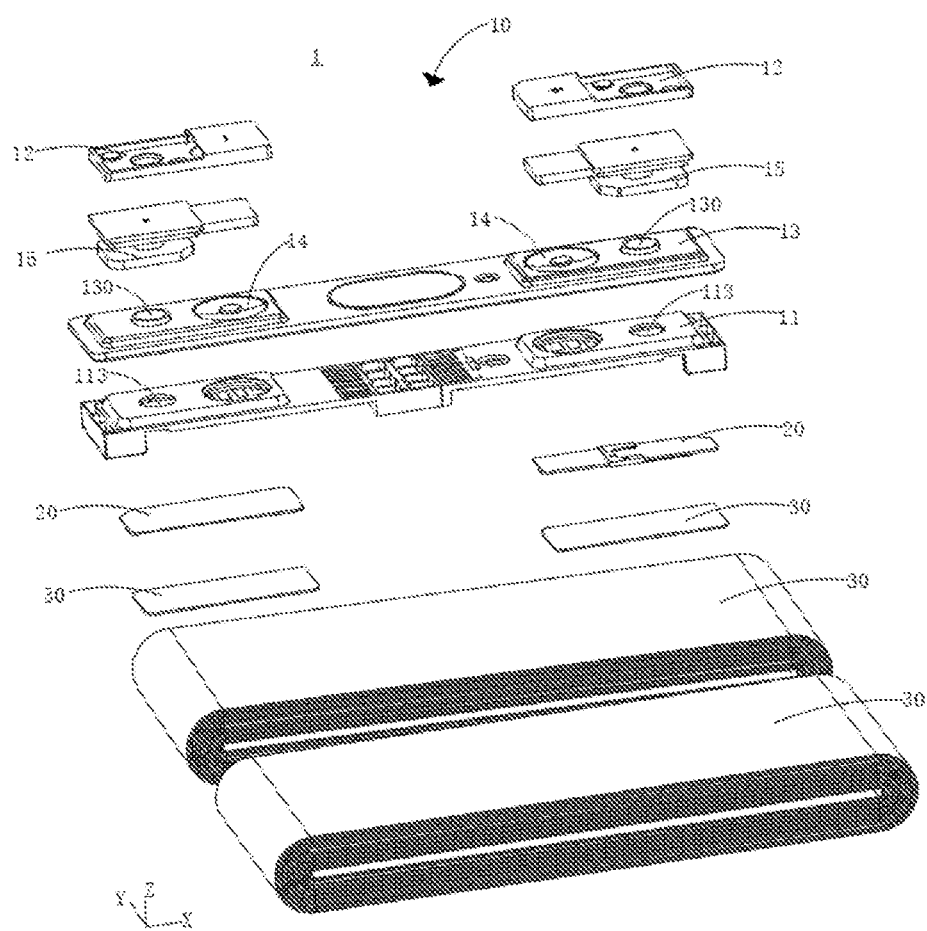
FIG. 18 is a partial structural exploded view of the energy storage device shown in FIG. 16.
Figure 19:
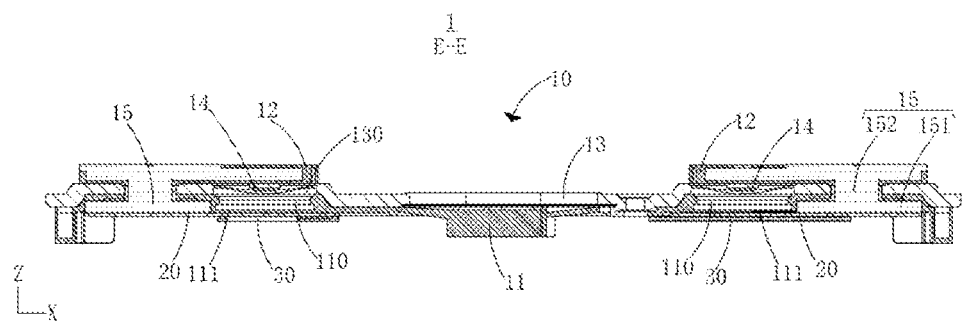
FIG. 19 is a schematic sectional view of the energy storage device shown in FIG. 16 along line E-E with cells removed.

Referring to FIGS. 9, 10 and 18, in this implementation, multiple first recesses 2121 are provided in a surface of the transition 212 that faces the insulator 22.

In this implementation, multiple first recesses 2121 may be further provided in a side surface of the transition 212 in the thickness direction Z. That is, multiple first recesses 2121 is provided in a surface of the transition 212 that faces the insulator 22. In other words, in this implementation, multiple first recesses 2121 may be provided in the first surface 215 of the transition 212. Since the first connecting portion 211 of the adapter 21 will be subsequently welded to the pole assembly 15, the second connecting portion 214 of the adapter 21 will be welded to the electrode assembly 30. Therefore, the provision of the multiple first recesses 2121 may reduce reflections generated during laser welding, and thus reduce a reflection rate and improve the anti-reflection effect, thereby avoiding pseudo soldering or poor soldering caused by reflections, increasing a welding excellence rate, and improving the welding effect.

Furthermore, when the current collecting member 20 is subsequently assembled with the lower plastic part 11, the side surface of the insulator 22 provided with the stepped recess 220 may be brought closer to the lower surface of the lower plastic part 11, and the surface of the transition 212 provided with the multiple first recesses 2121 may be brought away from the lower surface of the lower plastic part 11. In this way, not only the current collecting member 20 can be flush with and attached to the lower plastic part 11, but also the reflection rate can be reduced and the welding effect can be improved.

Alternatively, the shape of each first recess 2121 includes, but is not limited to, a square, a rectangle, a diamond, a circle, etc.

Alternatively, the multiple first recesses 2121 are arranged in array.

Figure 11:
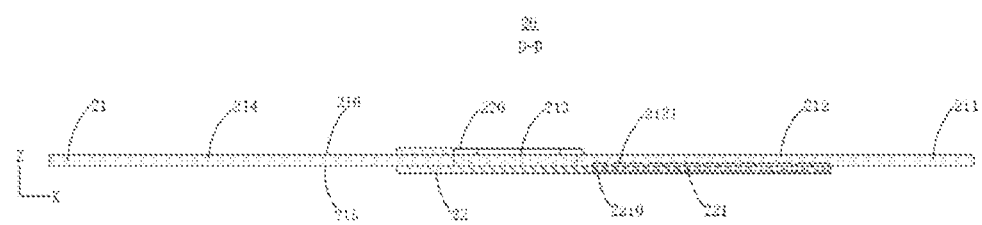
FIG. 11 is a schematic sectional view of the current collecting member shown in FIG. 1 along line D-D according to another implementation of the present disclosure.

Referring to FIG. 11, in this implementation, the surface of the insulator 22 close to the first surface 215 is provided with an extension 221, and multiple second recesses 2210 are provided in a surface of the extension 221 away from the transition 212. In a thickness direction Z of the energy storage device 1, orthogonal projection planes of the multiple second recesses 2210 at least partially overlap with orthogonal projection planes of the multiple first recesses 2121.

In this implementation, an extension 221 may be further arranged on the surface of the insulator 22 close to the first surface 215 of the adapter 21, and the extension 221 extends up to a position directly corresponding to the transition 212, thereby using the extension 221 to buffer and protect the transition 212, in order to prevent rigid contact between the transition 212 and other components and prevent damages to the transition 212. Furthermore, the arrangement of the extension 221 on a side of the adapter 21 can further reduce the amplitude of vibration of the transition 212, so as to prevent fractures of the adapter 21 caused by a relatively large amplitude of vibration of the transition 212 during use and transportation due to a relatively large length of the adapter 21, thereby increasing the structural strength of the adapter 21.

Furthermore, in this implementation, multiple second recesses 2210 may be further provided in the surface of the extension 221 away from the transition 212. In other words, multiple second recesses 2210 may be provided in a lower surface of the extension 221. In addition, in the thickness direction Z of the energy storage device 1, the orthogonal projection planes of the multiple second recesses 2210 at least partially overlap with the orthogonal projection planes of the multiple first recesses 2121. With the provision of the second recesses 2210 in the extension 221 and the arrangement of the second recesses 2210 that at least partially directly correspond to the first recesses 2121, the anti-reflection effect may be further improved by the cooperation between the first recesses 2121 and the second recesses 2210, that is, by a double recess structure, further reducing the reflections generated during laser welding, and reducing the reflection rate. Pseudo soldering or poor soldering caused by reflections is further avoided, the welding excellence rate is increased, and the welding effect is improved.

In an implementation, the orthogonal projection planes of the multiple second recesses 2210 partially overlap with the orthogonal projection planes of the multiple first recesses 2121, that is, the orthogonal projection planes of the multiple second recesses 2210 and the orthogonal projection planes of the multiple first recesses 2121 overlap only in some regions, and are staggered in the remaining regions. In another implementation, the orthogonal projection planes of the multiple second recesses 2210 completely overlap with the orthogonal projection planes of the multiple first recesses 2121, which can further improve the anti-reflection effect, increase the welding excellence rate and improve the welding effect. In other words, a larger overlapping region between the orthogonal projection planes of the multiple second recesses 2210 and the orthogonal projection planes of the multiple first recesses 2121 indicates a better anti-reflection effect.

Alternatively, the shape of each second recess 2210 includes, but is not limited to, a square, a rectangle, a diamond, a circle, etc.

Alternatively, the multiple second recesses 2210 are arranged in array.

Further, alternatively, the second recesses 2210 and the first recesses 2121 are exactly the same in shape, size, number and arrangement.

Figure 12:
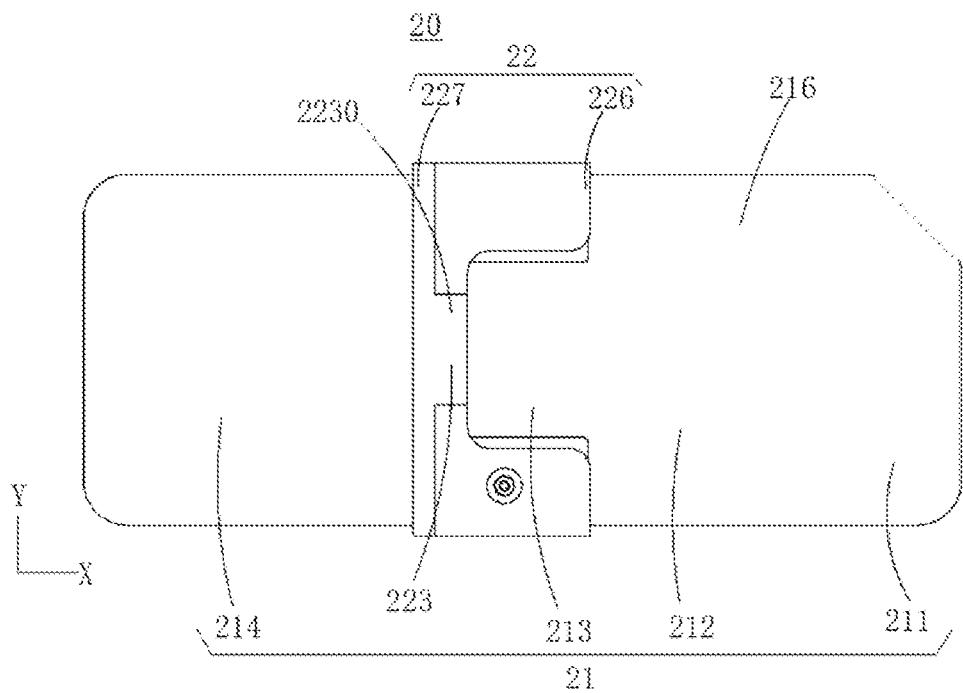
FIG. 12 is a top view of a current collecting member according to another implementation of the present disclosure.

Referring to FIG. 12, in this implementation, the third protective portion 228 includes a first covering portion 223. The first covering portion 223 is provided with a projection 2230 protruding in the length direction X of the adapter 21. The projection 2230 covers an end of the fuse portion 213 adjacent to the second connecting portion 214, and an end of the fuse portion 213 away from the second connecting portion 214 is exposed.

The third protective portion 228 in this implementation may include a first covering portion 223, where the first covering portion 223 is provided with a projection 2230 protruding in the length direction X of the adapter 21. In other words, the projection 2230 may be arranged to protrude in a direction from the second connecting portion 214 to the first connecting portion 211, and the end of the fuse portion 213 adjacent to the second connecting portion 214 is covered by the projection 2230. It may also be understood that the projection 2230 covers the second surface 216 of the fuse portion 213. The projection 2230 of the first covering portion 223 covers part of the fuse portion 213, which may prevent the fuse portion 213 from fracturing due to contact and collision between the fuse portion 213 and other components, thereby effectively protecting the fuse portion 213, and increasing the structural strength of the adapter 21. Furthermore, the projection 2230 may be further used to cover some sharp edges of the fuse portion 213 in the width direction Y of the adapter 21, so as to further prevent the electrode assembly 30 from contact with and being cut by these sharp edges.

Furthermore, since the projection 2230 covers the end of the fuse portion 213 adjacent to the second connecting portion 214 and the end of the fuse portion 213 away from the second connecting portion 214 is exposed, in other words, the projection 2230 covers only part of the second surface 216 of the fuse portion 213, the rest of the second surface 216 of the fuse portion 213 is exposed, and thus other purposes may be achieved subsequently by using the second surface 216 of the fuse portion 213. For example, the second surface 216 of the fuse portion 213 may be provided with an avoidance space, and the pole assembly 15 is avoided by means of this avoidance space.

Figure 3:
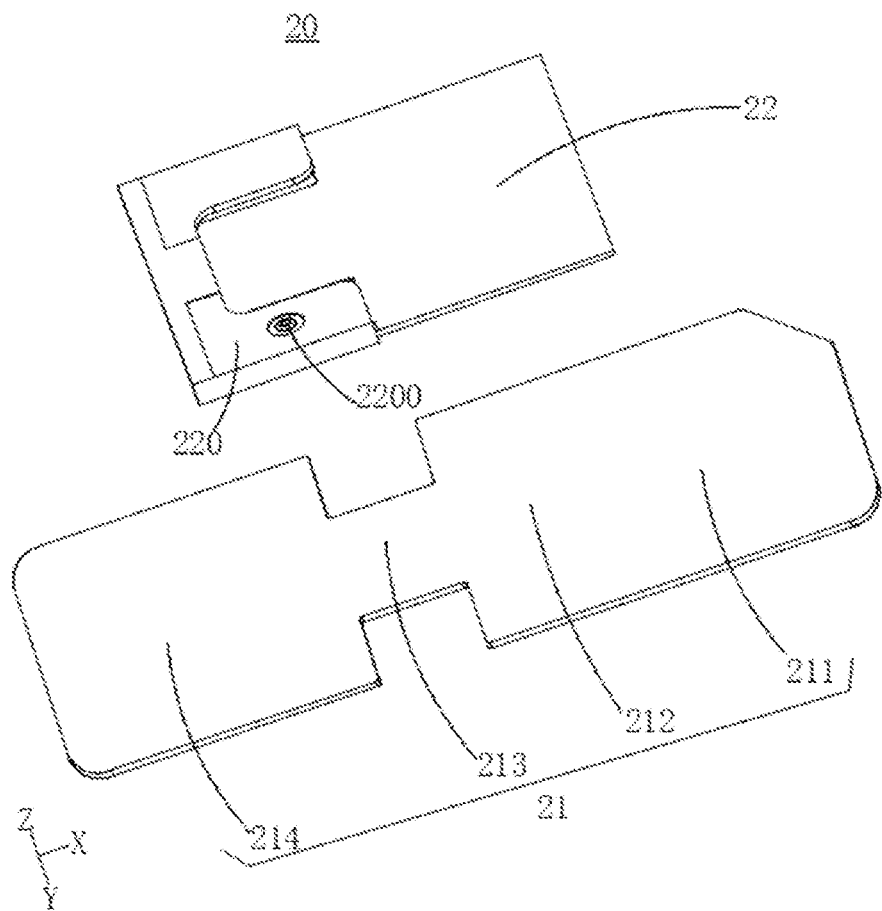
FIG. 3 is an exploded view of the current collecting member shown in FIG. 1.
Figure 13:
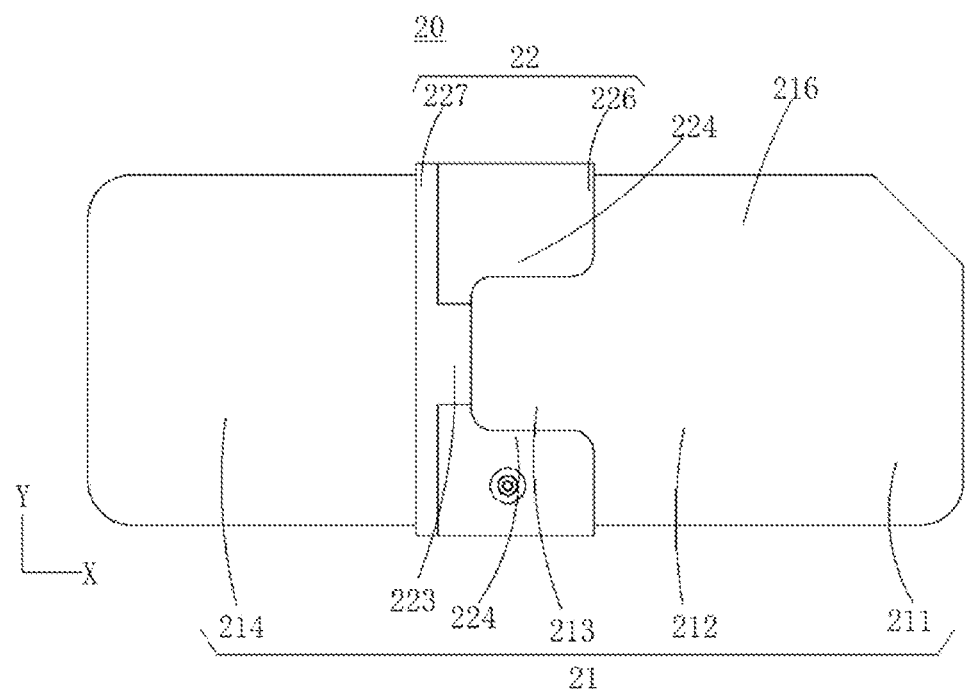
FIG. 13 is a top view of a current collecting member according to still another implementation of the present disclosure.
Figure 14:
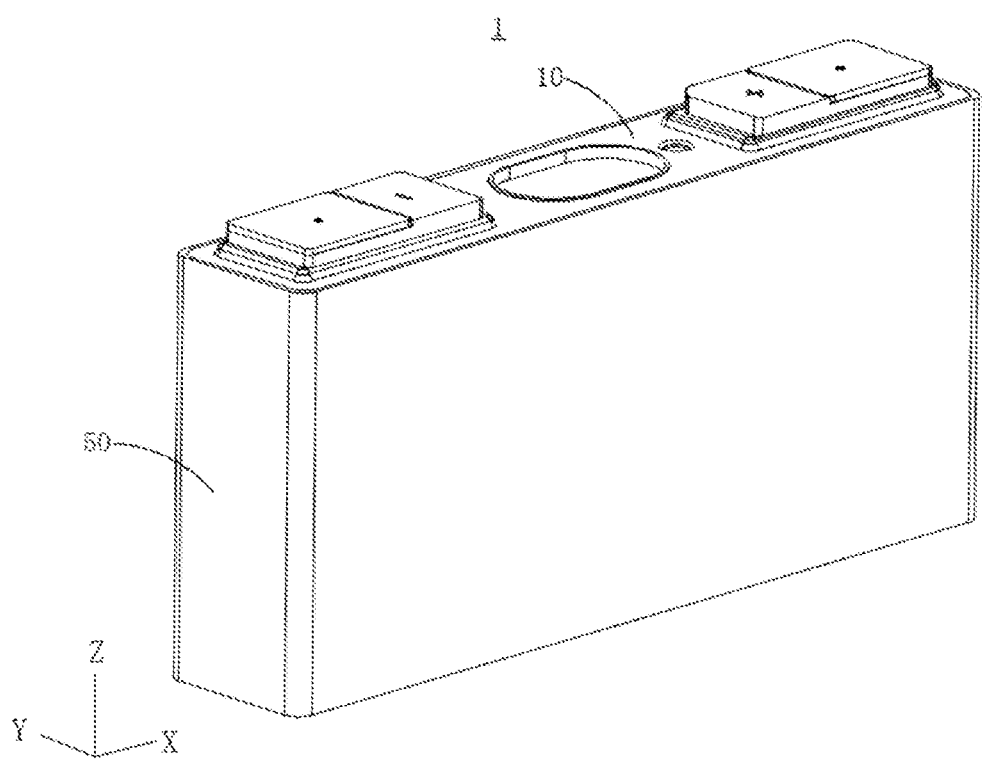
FIG. 14 is a schematic perspective structural diagram of an energy storage device according to an implementation of the present disclosure.
Figure 15:
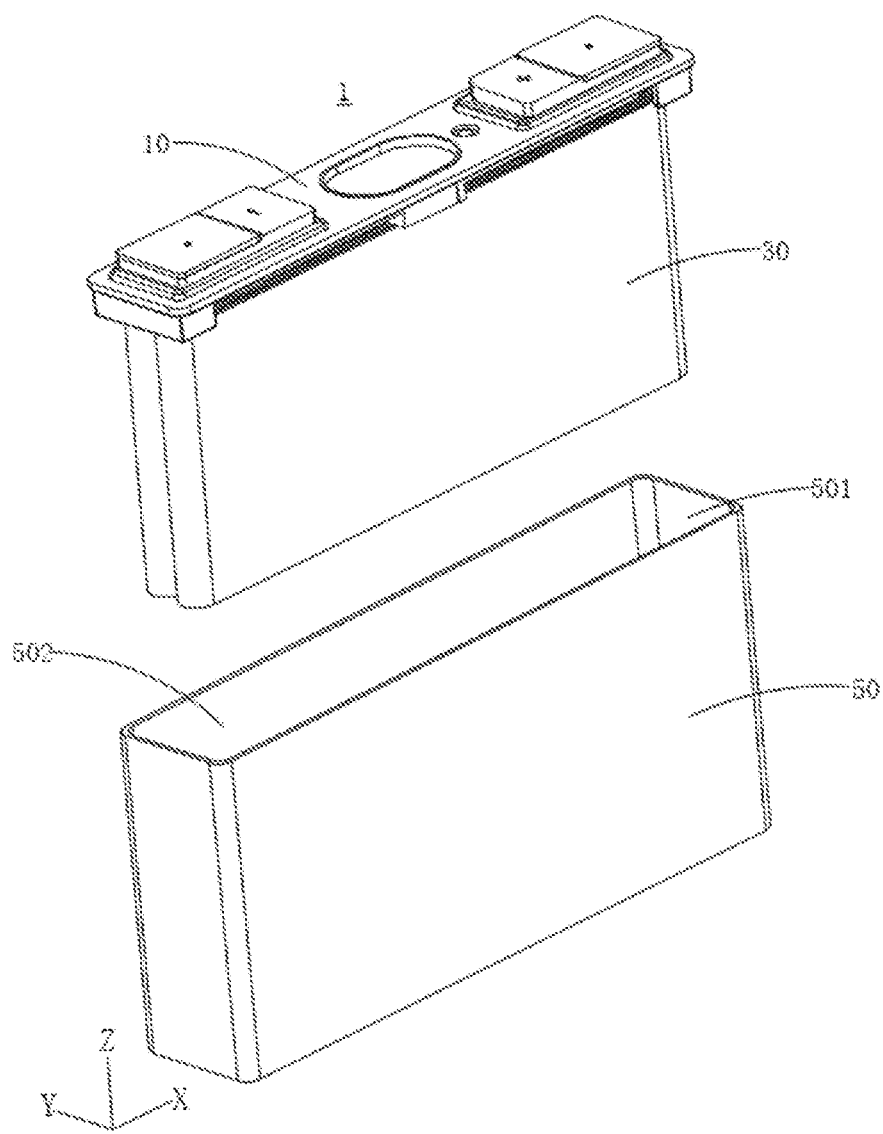
FIG. 15 is a schematic exploded view of the energy storage device shown in FIG. 14 with a housing.
Figure 16:
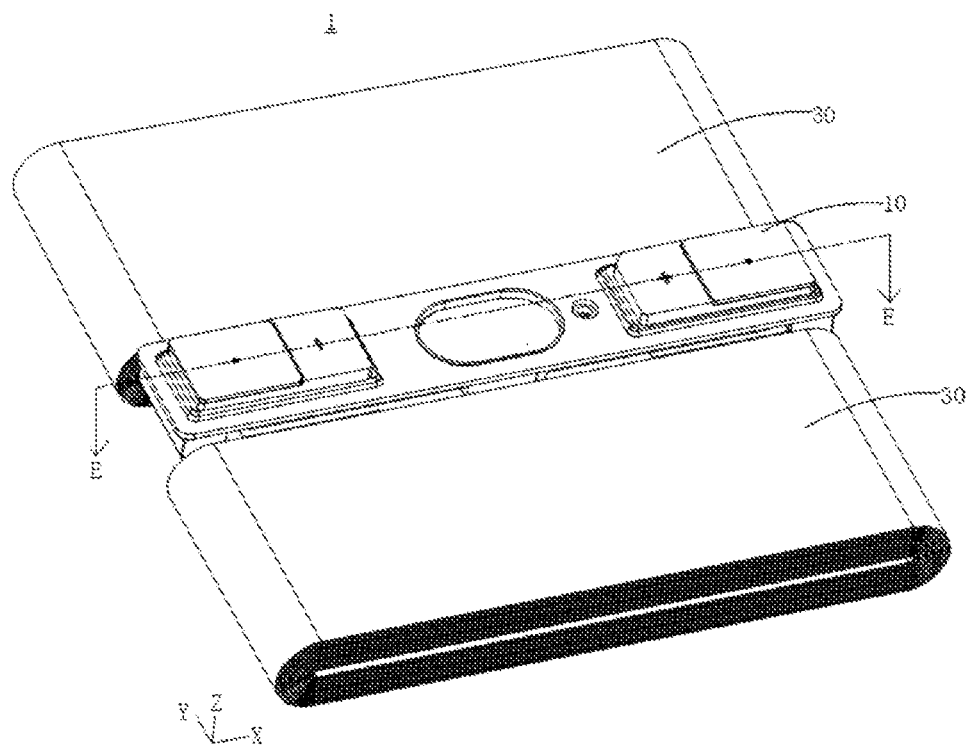
FIG. 16 is a schematic perspective structural diagram of the energy storage device shown in FIG. 14 in an unfolded state, with the housing removed.
Figure 17:
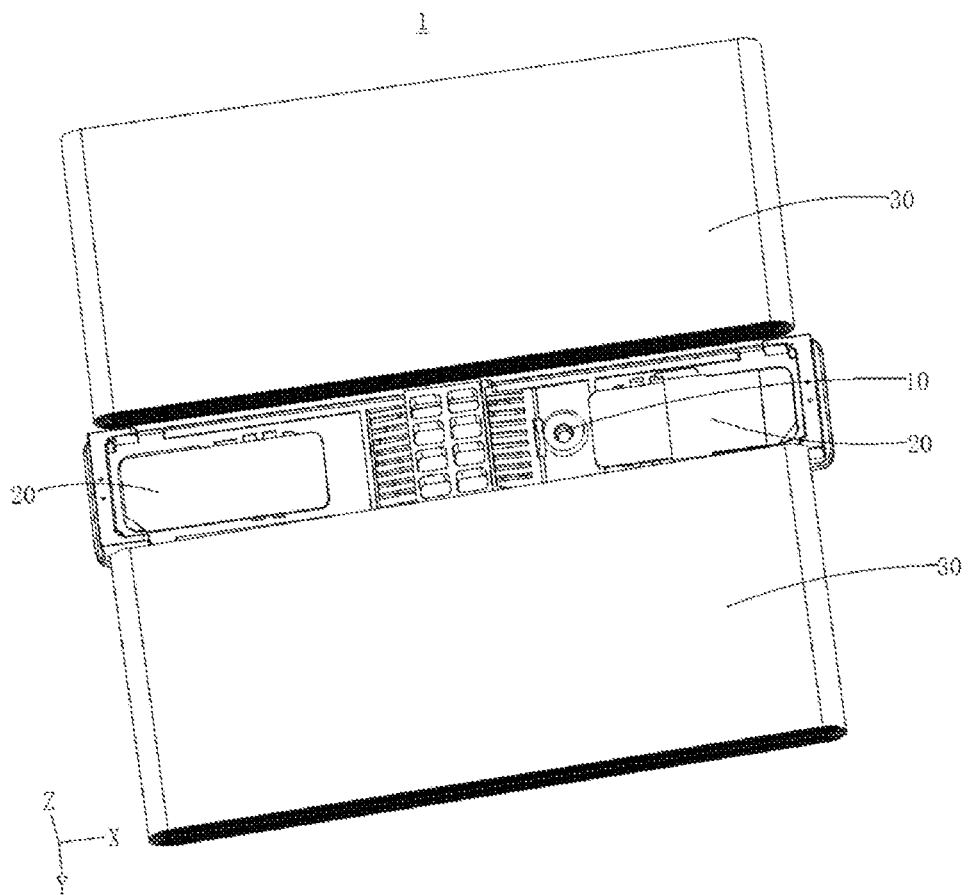
FIG. 17 is a schematic perspective structural diagram of the energy storage device shown in FIG. 16 from another perspective.

Referring to FIGS. 3 and 13 together, in this implementation, the third protective portion 228 further includes a second covering portion 224, the second covering portion 224 covering an end of the fuse portion 213 close to an edge of the adapter 21.

The third protective portion 228 of this implementation may further include a second covering portion 224 in addition to the first covering portion 223. Alternatively, one or two second covering portions 224 may be provided. When two second covering portions 224 are provided, the two second covering portions 224 are arranged opposite to each other in the width direction Y of the adapter 21. In this implementation, the second covering portion 224 may be used to cover the end of the fuse portion 213 close to the edge of the adapter 21. In this way, the second covering portion may cooperate with the first covering portion 223 to cover the fuse portion 213 from different directions, thereby further preventing the fuse portion 213 from fracturing due to contact and collision between the fuse portion 213 and other components, effectively protecting the fuse portion 213, and increasing the structural strength of the adapter 21. Furthermore, the two second covering portions 224 arranged opposite to each other may also respectively cover the two sharp edges of the fuse portion 213, so as to further prevent the electrode assembly 30 from contact with and being cut by the sharp edges of the fuse portion.

Referring to FIGS. 14 to 20 together, this implementation provides an energy storage device 1. The energy storage device 1 includes a housing 50 having an opening 501, the housing 50 being provided with an accommodating cavity 502; an electrode assembly 30 accommodated inside the accommodating cavity 502; an end cap assembly 10 covering the opening 501; a pole assembly 15 arranged in the end cap assembly 10, the pole assembly 15 including a flange 151; a lower plastic part 11 arranged between the electrode assembly 30 and the end cap assembly 10; and a current collecting member 20 provided in the above implementations of the present disclosure, where the current collecting member 20 is arranged on a side of the lower plastic part 11 away from the end cap assembly 10, the first connecting portion 211 of the current collecting member 20 is electrically connected to the pole assembly 15, and the second connecting portion 214 of the current collecting member 20 is electrically connected to the electrode assembly 30.

The energy storage device 1 may include, but is not limited to, a battery cell, a battery module, a battery pack, a battery system, etc. When the energy storage device 1 is a battery cell, the energy storage device may be a square battery. The energy storage device 1 mainly includes an end cap assembly 10, a lower plastic part 11, a pole assembly 15, a current collecting member 20, an electrode assembly 30, and a housing 50. The end cap assembly 10 includes an upper rubber part 12, a top cap 13, a stress member 14, etc. The housing 50 has an accommodating cavity 502 for accommodating the electrode assembly 30, and the housing 50 also has an opening 501 communicating with the accommodating cavity 502. The top cap 13 is mounted on an upper surface of the lower plastic part 11, a through hole is provided in the top cap 13, and the stress member 14 is mounted in the through hole. The top cap 13 has a first mounting hole 130, and the lower plastic part 11 has a second mounting hole 113. The first mounting hole 130 and the second mounting hole 113 are arranged opposite to each other. The pole assembly 15 includes a flange 151 and a riveting portion 152, where the riveting portion 152 passes through the first mounting hole 130 and the second mounting hole 113, and the flange 151 is arranged on a side surface of the lower plastic part 11 that faces away from the top cap 13, that is, the flange 151 is located on a lower surface of the lower plastic part 11. The current collecting member 20 is arranged on a side of the lower plastic part 11 away from the end cap assembly 10. The first connecting portion 211 of the adapter 21 of the current collecting member 20 is electrically connected to the pole assembly 15, and the second connecting portion 214 of the adapter 21 of the current collecting member 20 is electrically connected to the electrode assembly 30. Therefore, the pole assembly 15 and the electrode assembly 30 may be connected together by means of the current collecting member 20, so as to facilitate transmission of currents.

In this implementation, with the current collecting member 20 provided in the above implementations of the present disclosure, the peripheries of the first corners 2120 may be first covered by the first protective portion 226 of the insulator 22, such that the first corners 2120 are arranged in the first protective portion 226. Furthermore, the peripheries of the second corners 2140 is covered by the second protective portion 227 of the insulator 22, such that the second corners 2140 are arranged in the second protective portion 227. In this way, after the electrode assembly 30 is assembled with the adapter 21, the electrode assembly 30 may be brought into contact with the first protective portion 226 on the peripheries of the first corners 2120 and the second protective portion 227 on the peripheries of the second corners 2140, thereby preventing the electrode assembly 30 from contact with the first corners 2120 and the second corners 2140 around the fuse portion 213, preventing the electrode assembly 30 from being cut by the first corners 2120 and the second corners 2140, and effectively protecting the electrode assembly 30.

Furthermore, the insulator 22 may further include a third protective portion 228 in addition to the first protective portion 226 and the second protective portion 227. The third protective portion 228 is connected between the first protective portion 226 and the second protective portion 227, the third protective portion 228 covers the fuse portion 213 of the adapter 21, and the second surface 216 of the fuse portion 213 is partially exposed. In this implementation, the third protective portion 228 may further include the fuse portion 213 of the adapter 21, thereby providing a buffer for the fuse portion 213, effectively protecting the fuse portion 213, preventing the fuse portion 213 from fracturing due to the vibration of the current collecting member 20, and increasing the structural strength of the current collecting member 20. In addition, the third protective portion 228 may also cover sharp edges on each side of the fuse portion 213 to prevent the edges of the fuse portion 213 from cutting the electrode assembly 30, which not only effectively protects the energy storage device 1, but also improves the use safety and service life of the energy storage device 1.

Figure 20:
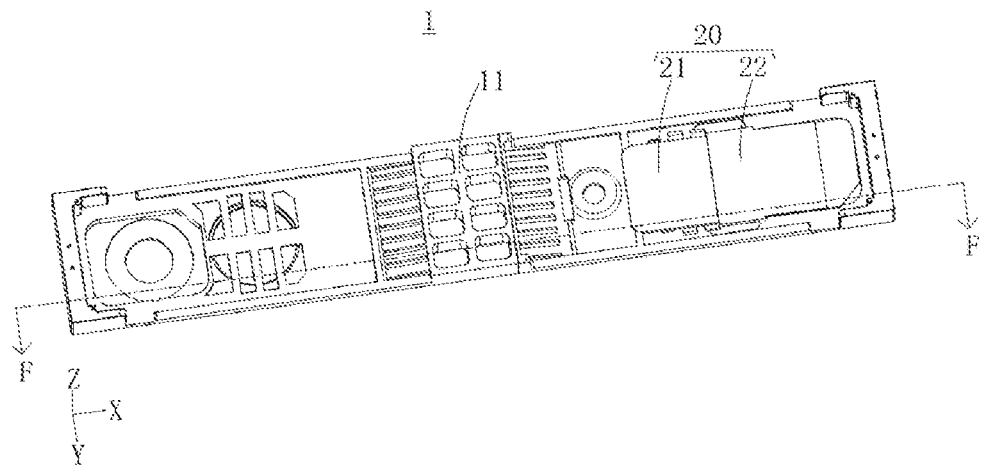
FIG. 20 is a schematic diagram of a lower plastic part fitting with a current collecting member according to an implementation of the present disclosure.
Figure 21:
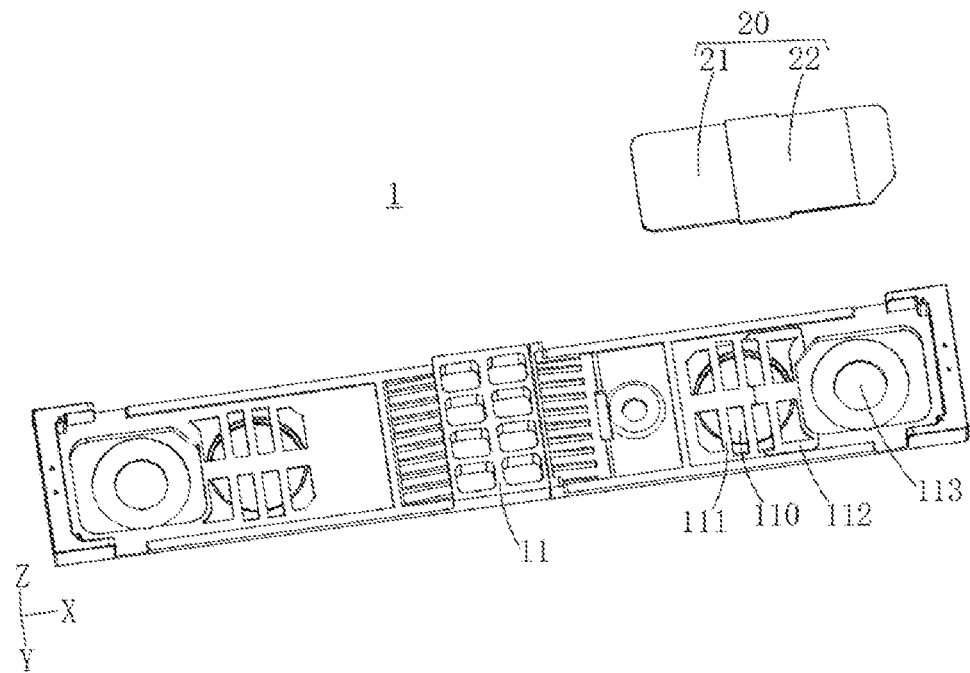
FIG. 21 is an exploded view of the lower plastic part and the current collecting member shown in FIG. 20.
Figure 22:
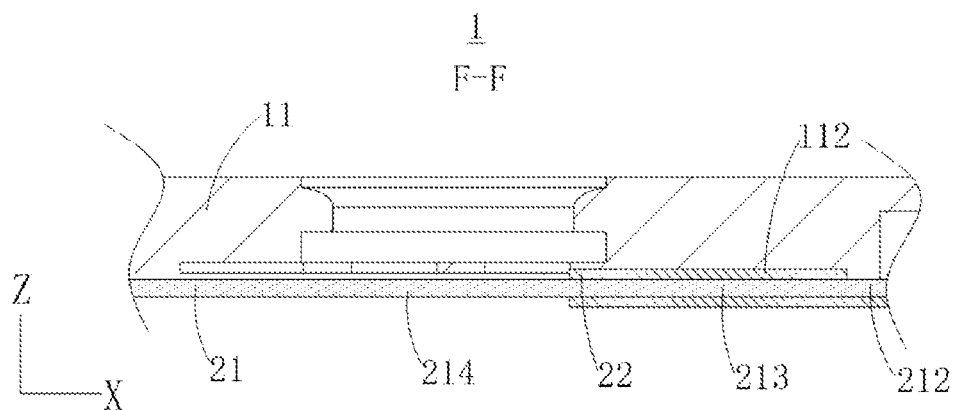
FIG. 22 is a schematic partial sectional view of the lower plastic part and the current collecting member shown in FIG. 20 along line F-F.
Figure 23:
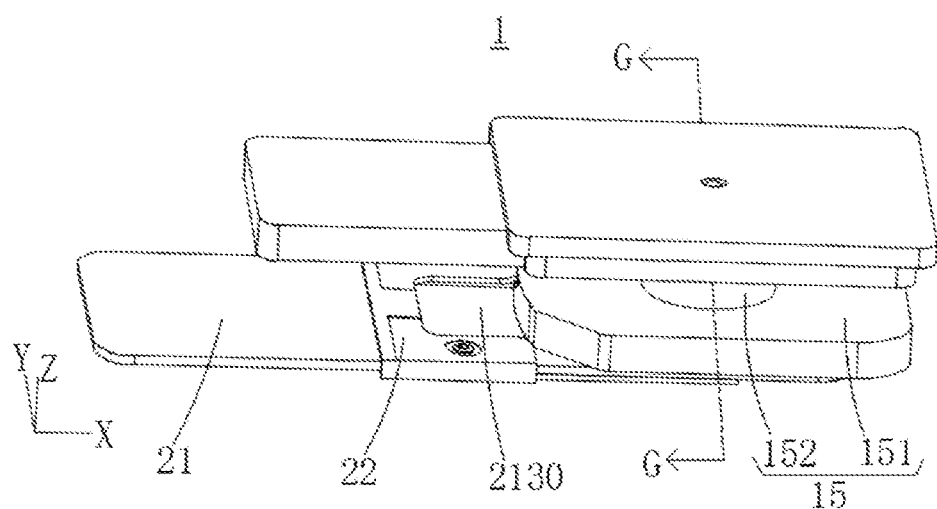
FIG. 23 is a schematic diagram of a positive post fitting with a current collecting member according to an implementation of the present disclosure.
Figure 24:
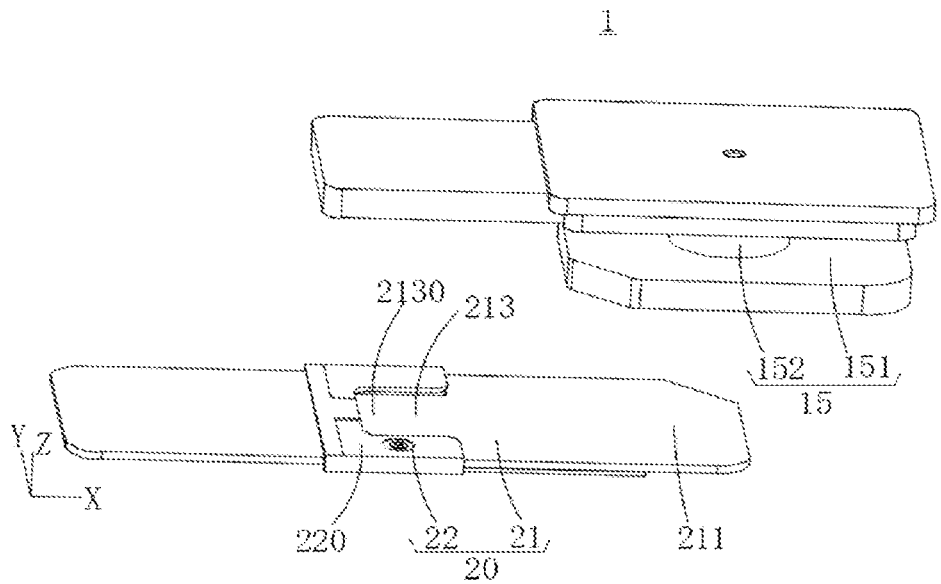
FIG. 24 is an exploded view of the positive post and the current collecting member shown in FIG. 23.
Figure 25:
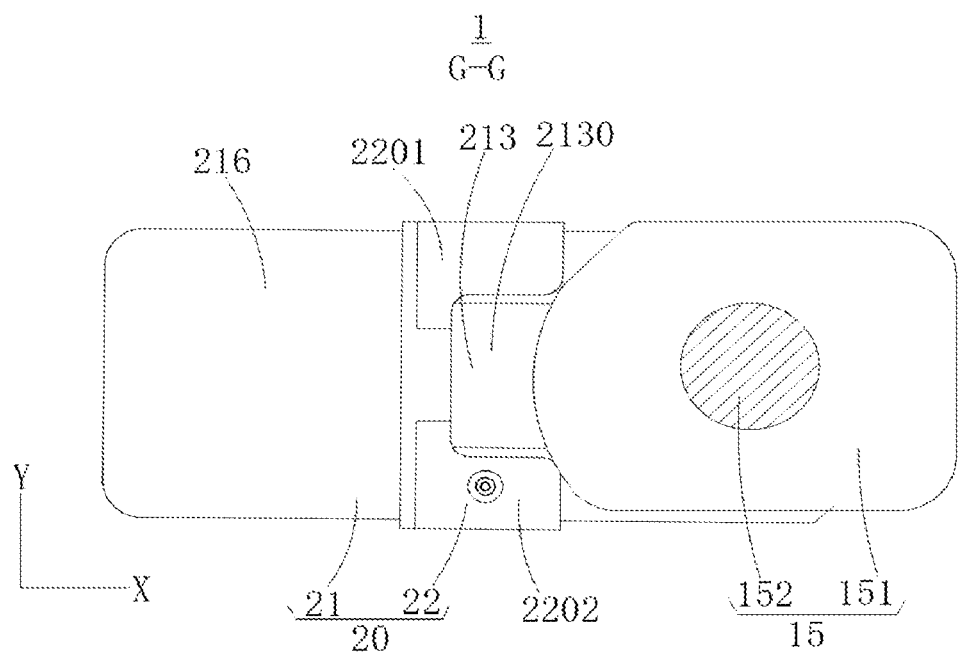
FIG. 25 is a schematic sectional view of the positive post and the current collecting member shown in FIG. 23 along line G-G.

Referring to FIGS. 20 to 22 together, in this implementation, an avoidance recess 112 is provided in a surface of the lower plastic part 11 close to the current collecting member 20, and the insulator 22 is at least partially accommodated inside the avoidance recess 112.

Since the pole assembly 15 penetrates the lower plastic part 11 and the top cap 13 from one side of the lower plastic part 11 to the other side of the lower plastic part 11, the current collecting member 20 located on the side of the lower plastic part 11 facing away from the top cap 13 may be connected to the pole assembly 15. It can be seen from the foregoings that the insulator 22 covers the fuse portion 213. In other words, the insulator 22 protrudes from the opposite sides of the adapter 21, and the thickness of the current collecting member 20 is the sum of the thickness of the adapter 21 and thicknesses of the insulator 22 located on the opposite sides of the adapter 21. It may also be understood that the thickness of the current collecting member 20 is the thicknesses of the insulators 22.

Therefore, in this implementation, an avoidance recess 112 may be provided in the side surface of the lower plastic part 11 close to the current collecting member 20, and the insulator 22 that is located on the side of the fuse portion 213 close to the lower plastic part 11 is at least partially fitted into the avoidance recess 112. It may also be understood that the insulator 22 is at least partially accommodated inside the avoidance recess 112. the avoidance recess 112 is provided in the lower surface of the lower plastic part 11 to avoid the insulator 22 that protrudes from the side of the adapter 21 close to the lower plastic part 11, such that the current collecting member 20 tends to be flush with the lower plastic part 11 when stacked and fitted with the lower plastic part, and the overall thickness of the lower plastic part 11 fitted with the current collecting member 20 is reduced.

Alternatively, the lower plastic part 11 has a through hole 110 corresponding to the stress member 14, the lower plastic part 11 is also provided with a grid structure 111 for covering the through hole 110, the grid structure 111 is configured to divide the through hole 110 into multiple slots, and the avoidance recess 112 may be arranged around the periphery of the grid structure 111, thereby making the structure on the lower plastic part 11 more compact, and saving the space for the lower plastic part 11. Furthermore, the insulator 22 may be fitted with the grid structure 111 by providing the avoidance recess 112 around the periphery of the grid structure 111, so the insulator 22 may be used to protect the grid structure 111 and prevent damages of the grid structure 111 due to the vibration during use or transportation of the energy storage device 1.

Alternatively, the shape of the avoidance recess 112 may be the same as that of the insulator 22 on the side of the fuse portion 213 close to the lower plastic part 11.

In an actual production process, in order to ensure the welding effect of the flange 151 of the energy storage device 1, the flange 151 may not be dimensioned to be too small in the length direction X of the energy storage device 1, otherwise the flange 151 and the current collecting member 20 may suffer from the problems of poor soldering and pseudo soldering. In addition, in order to ensure that the flange 151 with such a large dimension can be closely fitted into the current collecting member 20. Referring to FIGS. 19 and 23 to 25, in this implementation, in the thickness direction Z of the adapter 21, a stepped recess 220 is provided in the surface of the insulator 22 close to the second surface 216 of the adapter 21. The stepped recess 220 includes a first recess 2201 and a second recess 2202 that are arranged opposite to each other in the width direction Y of the adapter 21. The fuse portion 213 is arranged between the first recess 2201 and the second recess 2202. A side of the first recess 2201 close to the flange 151 and a side of the second recess 2202 close to the flange 151 define a connecting line L, and an end of the flange 151 adjacent to the fuse portion 213 extends beyond the connecting line L towards the insulator 22. A side of the flange 151 close to the insulator 22 extends beyond the connecting line L towards the insulator 22 by a distance D1 of 1.12-6.78 mm. Alternatively, the side of the flange 151 close to the insulator 22 extends beyond the connecting line L towards the insulator 22 by a distance D1 that may be 1.12 mm, 1.28 mm, 2.37 mm, 3.45 mm, 4.17 mm, 5.18 mm, 6.2 mm, 6.78 mm, etc.

The pole assembly 15 may include a flange 151 and a riveting portion 152 that are connected to each other, where the flange 151 is located on the side surface of the lower plastic part 11 close to the current collecting member 20, the riveting portion 152 penetrates the lower plastic part 11 and the top cap 13 and is riveted to a pressing block, and the pressing block is mounted on the upper rubber part 12. The first connecting portion 211 of the adapter 21 may be welded to the flange 151 of the pole assembly 15 to achieve connection between the adapter 21 and the pole assembly 15. Since the insulator 22 covers the fuse portion 213 of the adapter 21, the insulator 22 is arranged on opposite sides of the fuse portion 213. In this implementation, the fuse portion 213 can be sandwiched between the first recess 2201 of the stepped recess 220 and the second recess 2202 of the stepped recess 220, and the second surface 216 of the fuse portion 213 is provided with an avoidance space 2130. In this way, when the first connecting portion 211 is welded to the flange 151, the end of the flange 151 close to the fuse portion 213 may be located inside the avoidance space 2130, such that the current collecting member 20 is attached to the surface of the flange 151 in a flush manner, thereby saving the internal space of the energy storage device 1 and increasing energy density.

The formation of the above avoidance space 2130 may also be understood as that the insulator 22 located on the second surface 216 of the fuse portion 213 is provided with an opening that forms the avoidance space 2130. Of course, it may also be understood that the avoidance space 2130 is enclosed jointly by the first covering portion 223 of the third protective portion 228 of the insulator 22 located on the second surface 216 of the fuse portion 213, two second covering portions 224 and the fuse portion 213.

Figure 26:
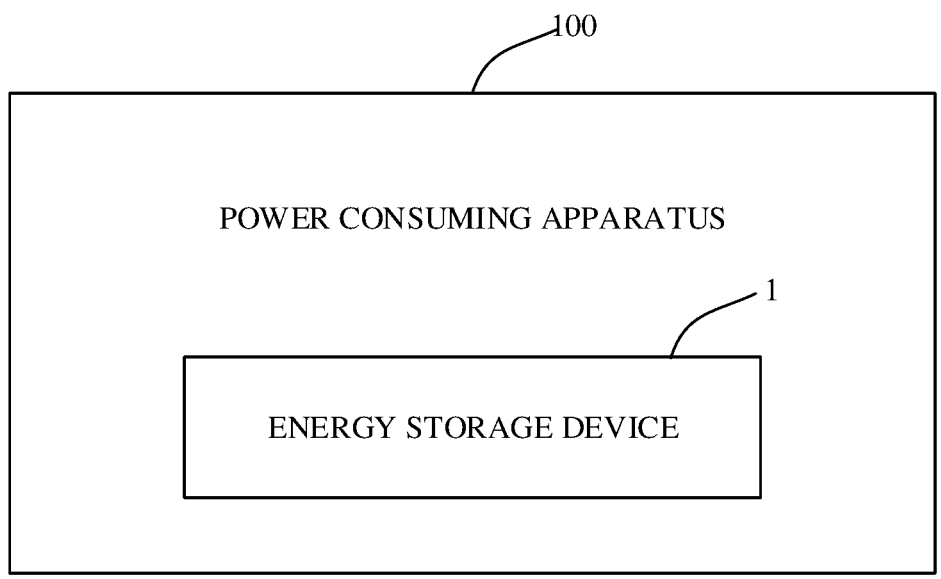
FIG. 26 is a schematic block diagram of a power consuming apparatus.

As illustrated in FIG. 26, this implementation provides a power consuming apparatus 100, including an energy storage device 1 provided in the above implementation of the present disclosure, the energy storage device 1 supplying power to the power consuming apparatus 100.

The power consuming apparatus provided in this implementation may be applied in the fields of vehicles, power storage stations, etc. In an example in which the power consuming apparatus is illustrated as a vehicle, the vehicle may be a fuel vehicle, a gas vehicle or a new energy vehicle. The new energy vehicle may be a battery electric vehicle, a hybrid electric vehicle, an extended-range vehicle, etc. The vehicle includes a battery, a controller, and a motor. The battery is configured to supply power to the controller and the motor as a power source for operating and driving the vehicle. For example, the battery is configured to meet the operation power demands during starting, navigation, and traveling of the vehicle. For example, the battery supplies power to the controller, the controller controls the battery to supply power to the motor, and the motor receives and uses the power from the battery as a power supply for driving the vehicle, replacing or partially replacing fuel or natural gas to provide driving power for the vehicle.

In the energy storage device provided in the above implementation of the present disclosure, first, the first protective portion may cover the first corners and the second protective portion may cover the second corners, in other words, the first corners are arranged in the first protective portion and the second corners are arranged in the second protective portion. In this way, after the electrode assembly is assembled with the adapter, the electrode assembly may be brought into contact with the first protective portion on the peripheries of the first corners and the second protective portion on the peripheries of the second corners, thereby preventing the electrode assembly from contact with the first corners and the second corners around the fuse portion, preventing the electrode assembly from being cut by the first corners and the second corners, and effectively protecting the electrode assembly. Second, according to the present disclosure, the third protective portion may cover the fuse portion of the adapter, thereby providing a buffer for the fuse portion, effectively protecting the fuse portion, preventing the fuse portion from fracturing due to the vibration of the current collecting member, and increasing the structural strength of the current collecting member. In addition, the third protective portion may also cover sharp edges on each side of the fuse portion to prevent the edges of the fuse portion from cutting the electrode assembly, which not only effectively protects the power consuming apparatus, but also improves the use safety and service life of the power consuming apparatus.

Reference to "an embodiment" or "an implementation" herein means that specific features, structures, and characteristics described in combination with the embodiment or implementation may be included in at least one embodiment of the present disclosure. The phrase at various locations in the specification does not necessarily refer to the same embodiment, or an independent or alternative embodiment exclusive of other embodiments. Those of ordinary skill in the art understand explicitly or implicitly that the embodiments described herein may be combined with other embodiments.

It should be noted that the terms "first", "second" and the like in the specification and claims of the present disclosure as well as the above figures are used to distinguish different objects, rather than to describe a specific order. Additionally, the terms "include" and "have" and any variations thereof are intended to cover a non-exclusive inclusion.

In this specification, for the sake of convenience, words and expressions indicating an orientation or positional relationship such as "middle", "upper", "lower", "front", "rear", "vertical", "horizontal", "top", "bottom", "inner" and "outer" are intended to illustrate the positional relationship between the constituent elements with reference to the accompanying drawings, and are merely for ease of description of this specification and simplification of the description, rather than indicating or implying that the device or elements referred to must have a specific orientation or be constructed and operated in a specific orientation, and therefore cannot be construed as limiting the present disclosure. The positional relationship between the constituent elements is appropriately changed depending on the orientations of the described constituent elements. Therefore, words and expressions are not limited to the words and expressions mentioned in the specification, and can be replaced appropriately depending on a situation.

In this specification, unless otherwise explicitly specified and defined, terms such as "mounting", "connecting" and "connection" should be understood in a broad sense. For example, they may be fixed connection, detachable connection, or integral connection; may be mechanical connection or electrical connection; or may be direct connection, indirect connection by means of an intermediate member, or internal communication between two elements. The meanings of the foregoing terms in the present disclosure may be understood by those of ordinary skill in the art according to a situation.

The contents provided in the implementations of the present disclosure have been described in detail above, and the principles and implementations of the present disclosure are set out and explained herein. The above descriptions are only used to help understand the method and core idea of the present disclosure. In addition, for those of ordinary skill in the art, changes may be made to the specific implementations and application range based on the idea of the present disclosure. In conclusion, the contents of this specification should not be construed as a limitation to the present disclosure.

What is claimed is:

1. An energy storage device, comprising:
   a housing having an opening, wherein the housing defines an accommodating cavity;
   an electrode assembly accommodated inside the accommodating cavity;
   an end cap assembly covering the opening;
   a pole assembly arranged in the end cap assembly, the pole assembly comprising a flange;
   a lower plastic part arranged between the electrode assembly and the end cap assembly; and
   a current collecting member flush with and attached to a surface of the lower plastic part away from the end cap assembly, wherein the current collecting member comprises an adapter and an insulator, the adapter comprises a first surface and a second surface that are arranged in a thickness direction of the adapter, the first surface is located on a side of the adapter that faces an electrode assembly of the energy storage device, the second surface is located on a side of the adapter that faces away from the electrode assembly of the energy storage device, the adapter comprises a first connecting portion, a fuse portion and a second connecting portion in a length direction of the adapter, the first connecting portion of the current collecting member is electrically connected to the pole assembly, the second connecting portion of the current collecting member is electrically connected to the electrode assembly, and the fuse portion is connected between the first connecting portion and the second connecting portion; a ratio of a width of the fuse portion in a width direction of the adapter to a width of the first connecting portion and a ratio of the width of the fuse portion in the width direction of the adapter to a width of the second connecting portion each are in a range from $1/6$ to $4/5$; and the first connecting portion is provided with first corners at an end of the first connecting portion close to the second connecting portion, the second connecting portion is provided with second corners at an end of the second connecting portion close to the first connecting portion, the insulator is provided with a first protective portion, a second protective portion and a third protective portion in the length direction of the adapter, the first protective portion covers the first corners, the second protective portion covers the second corners, the third protective portion is connected to the first protective portion and the second protective portion, the third protective portion covers a first surface of the fuse portion of the adapter, and a second surface of the fuse portion is at least partially exposed from the insulator;

in the thickness direction of the adapter, a stepped recess is defined in a surface of the insulator close to the second surface of the adapter, the stepped recess comprises a first recess and a second recess that are arranged opposite to each other in the width direction of the adapter, the fuse portion is arranged between the first recess and the second recess, a side of the first recess close to the flange and a side of the second recess close to the flange define a connecting line L, and an end of the flange adjacent to the fuse portion extends beyond the connecting line L towards the insulator.

2. The energy storage device of claim 1, wherein the adapter further comprises a transition, the transition is connected between the fuse portion and the first connecting portion, the transition has two first corners arranged opposite to each other in the width direction of the adapter at an end of the transition close to the fuse portion, the second connecting portion has two second corners arranged opposite to each other in the width direction of the adapter an end of the second connecting portion close to the fuse portion, and the third protective portion is connected between the first protective portion and the second protective portion.

3. The energy storage device of claim 1, wherein in the length direction of the adapter, the insulator has a dimension L1, and a distance L2 between the first connecting portion and the second connecting portion satisfies 0.01 mm≤L1−L2≤3.1 mm.

4. The energy storage device of claim 1, wherein in the width direction of the adapter, the insulator has a dimension L3, and the adapter has the width L4, wherein 0.01 mm≤L3−L4≤2.4 mm.

5. The energy storage device of claim 1, wherein in the thickness direction of the adapter, the insulator defines a stepped recess in a surface of the insulator close to the second surface of the adapter, a bottom wall of the stepped recess is provided with an injection-molded necking portion, and the height of the injection-molded necking portion is less than or equal to the depth of the stepped recess.

6. The energy storage device of claim 5, wherein the ratio of the height of the injection-molded necking portion to the depth of the stepped recess is greater than or equal to 1/10 and less than or equal to 9/10.

7. The energy storage device of claim 6, wherein the height of the injection-molded necking portion ranges from 0.06 mm to 0.31 mm.

8. The energy storage device of claim 2, wherein a plurality of first recesses are defined in a surface of the transition that faces the insulator, the insulator is provided with an extension on a surface of the insulator close to the first surface, a plurality of second recesses are defined in a surface of the extension away from the transition, and in a thickness direction of the energy storage device, orthogonal projection planes of the plurality of second recesses at least partially overlap with orthogonal projection planes of the plurality of first recesses.

9. The energy storage device of claim 1, wherein the third protective portion comprises:

a first covering portion, the first covering portion being provided with a projection protruding in the length direction of the adapter, the projection covering an end of the fuse portion adjacent to the second connecting portion, and an end of the fuse portion away from the second connecting portion being exposed.

10. The energy storage device of claim 9, wherein the third protective portion further comprises a second covering portion, the second covering portion covering an end of the fuse portion close to an edge of the adapter.

11. The energy storage device of claim 1, wherein the first corners and the second corners are rounded corners, each of the first corners has an arc radius of 2.1-3.6 mm, and each of the second corners has an arc radius of 2.1-3.6 mm.

12. The energy storage device of claim 1, wherein an avoidance recess is defined in a surface of the lower plastic part close to the current collecting member, and the insulator is at least partially accommodated inside the avoidance recess.

13. A power consuming apparatus comprising an energy storage device supplying power to the power consuming apparatus, wherein the energy storage device comprises:

a housing having an opening, wherein the housing defines an accommodating cavity;

an electrode assembly accommodated inside the accommodating cavity;

an end cap assembly covering the opening;

a pole assembly arranged in the end cap assembly, the pole assembly comprising a flange;

a lower plastic part arranged between the electrode assembly and the end cap assembly; and a current collecting member flush with and attached to a surface of the lower plastic part away from the end cap assembly, wherein the current collecting member comprises an adapter and an insulator, the adapter comprises a first surface and a second surface that are arranged in a thickness direction of the adapter, the first surface is located on a side of the adapter that faces an electrode assembly of the energy storage device, the second surface is located on a side of the adapter that faces away from the electrode assembly of the energy storage device, the adapter comprises a first connecting portion, a fuse portion and a second connecting portion in a length direction of the adapter, the first connecting portion of the current collecting member is electrically connected to the pole assembly, the second connecting portion of the current collecting member is electrically connected to the electrode assembly, and the fuse portion is connected between the first connecting portion and the second connecting portion; a ratio of a width of the fuse portion in a width direction of the adapter to a width of the first connecting portion and a ratio of the width of the fuse portion in the width direction of the adapter to a width of the second connecting portion each are in a range from 1/6 to 4/5; and the first connecting portion is provided with first corners at an end of the first connecting portion close to the second connecting portion, the second connecting portion is provided with second corners at an end of the second connecting portion close to the first connecting portion, the insulator is provided with a first protective portion, a second protective portion and a third protective portion in the length direction of the adapter, the first protective portion covers the first corners, the second protective portion covers the second corners, the third protective portion is connected to the first protective portion and the second protective portion, the third protective portion covers a first surface of the fuse portion of the adapter, and a second surface of the fuse portion is at least partially exposed from the insulator;

in the thickness direction of the adapter, a stepped recess is defined in a surface of the insulator close to the second surface of the adapter, the stepped recess comprises a first recess and a second recess that are arranged opposite to each other in the width direction of the adapter, the fuse portion is arranged between the first recess and the second recess, a side of the first recess close to the flange and a side of the second recess close to the flange define a connecting line L, and an end of the flange adjacent to the fuse portion extends beyond the connecting line L towards the insulator.

14. The power consuming apparatus of claim 13, wherein the adapter further comprises a transition, the transition is connected between the fuse portion and the first connecting portion, the transition has two first corners arranged opposite to each other in the width direction of the adapter at an end of the transition close to the fuse portion, the second connecting portion has two second corners arranged opposite to each other in the width direction of the adapter an end of the second connecting portion close to the fuse portion, and the third protective portion is connected between the first protective portion and the second protective portion.

15. The power consuming apparatus of claim 13, wherein in the length direction of the adapter, the insulator has a dimension L1, and a distance L2 between the first connecting portion and the second connecting portion satisfies 0.01 mm≤L1−L2≤3.1 mm.

16. The power consuming apparatus of claim 13, wherein in the width direction of the adapter, the insulator has a dimension L3, and the adapter has a width L4, wherein 0.01 mm≤L3−L4≤2.4 mm.

17. The power consuming apparatus of claim 13, wherein in the thickness direction of the adapter, the insulator defines a stepped recess in a surface of the insulator close to the second surface of the adapter, a bottom wall of the stepped recess is provided with an injection-molded necking portion, and the height of the injection-molded necking portion is less than or equal to the depth of the stepped recess.

18. The power consuming apparatus of claim 17, wherein the ratio of the height of the injection-molded necking portion to the depth of the stepped recess is greater than or equal to 1/10 and less than or equal to 9/10.

19. The power consuming apparatus of claim 18, wherein the height of the injection-molded necking portion ranges from 0.06 mm to 0.31 mm.

20. The power consuming apparatus of claim 14, wherein a plurality of first recesses are defined in a surface of the transition that faces the insulator, the insulator is provided with an extension on a surface of the insulator close to the first surface, a plurality of second recesses are defined in a surface of the extension away from the transition, and in a thickness direction of the energy storage device, orthogonal projection planes of the plurality of second recesses at least partially overlap with orthogonal projection planes of the plurality of first recesses.

* * * * *